US011423279B2

(12) United States Patent
Jesme et al.

(10) Patent No.: US 11,423,279 B2
(45) Date of Patent: Aug. 23, 2022

(54) RADIO FREQUENCY IDENTIFICATION TAG

(71) Applicant: 3M INNOVATIVE PROPERTIES COMPANY, St. Paul, MN (US)

(72) Inventors: Ronald D. Jesme, Plymouth, MN (US); Andrew P. Bonifas, Alberta (CA); Nicholas T. Gabriel, Woodbury, MN (US); Christian Weinmann, Alsdorf (DE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 582 days.

(21) Appl. No.: 15/561,211

(22) PCT Filed: Mar. 17, 2016

(86) PCT No.: PCT/US2016/022887
§ 371 (c)(1),
(2) Date: Sep. 25, 2017

(87) PCT Pub. No.: WO2016/160359
PCT Pub. Date: Oct. 6, 2016

(65) Prior Publication Data
US 2018/0068214 A1 Mar. 8, 2018

Related U.S. Application Data

(60) Provisional application No. 62/141,633, filed on Apr. 1, 2015.

(51) Int. Cl.
*G06K 19/077* (2006.01)
(52) U.S. Cl.
CPC ... *G06K 19/07758* (2013.01); *G06K 19/0775* (2013.01); *G06K 19/07754* (2013.01); *G06K 19/07783* (2013.01)

(58) Field of Classification Search
CPC ........ G06K 19/07758; G06K 19/0775; G06K 19/07754; G06K 19/07783
(Continued)

(56) References Cited

U.S. PATENT DOCUMENTS 6,164,551 A * 12/2000 Altwasser .............. G01V 15/00
235/383
6,486,780 B1 11/2002 Garber
(Continued)

FOREIGN PATENT DOCUMENTS

| CN | 102629337 | 4/2012 |
| GB | 2333062 | 7/1999 |

OTHER PUBLICATIONS

3M Digital Library Assistant (Model 804), 2012, pp. 1-2.
(Continued)

*Primary Examiner* — Eric Blount
(74) *Attorney, Agent, or Firm* — Clifton F. Richardson

(57) ABSTRACT

Radio frequency identification (RFID) tags are described that include a substrate, an antenna disposed on a major surface of the substrate, an integrated circuit (IC) disposed on a major surface of the substrate, and one or more stand-alone capacitors disposed on a major surface of the substrate. The antenna may have a length less than about 2 meters between first and second ends of the antenna. The integrated circuit may have an effective capacitance less than about 1000 pF and the one or more stand-alone capacitors may have an equivalent capacitance greater than 500 pF and may be connected in parallel with the antenna and the IC.

11 Claims, 4 Drawing Sheets

(58) Field of Classification Search
USPC .................................................. 340/572.7
See application file for complete search history.

(56) References Cited

U.S. PATENT DOCUMENTS

| | | | |
|---|---|---|---|
| 6,696,954 | B2 | 2/2004 | Chung |
| 2005/0001779 | A1* | 1/2005 | Copeland ............ G06K 7/10336 343/867 |
| 2005/0001785 | A1 | 1/2005 | Ferguson |
| 2006/0250250 | A1* | 11/2006 | Youn ................ G06K 19/07749 340/572.7 |
| 2009/0201116 | A1* | 8/2009 | Orihara ............ G06K 19/07749 336/200 |
| 2010/0123553 | A1* | 5/2010 | Banerjee .............. H01Q 1/2208 340/10.1 |
| 2011/0013491 | A1* | 1/2011 | Fujisawa ................ G04C 10/02 368/10 |
| 2011/0065387 | A1* | 3/2011 | Hayashi .............. H01Q 1/2225 455/41.2 |
| 2012/0212330 | A1* | 8/2012 | Halberthal ......... G06K 7/10316 340/10.1 |
| 2013/0231046 | A1 | 9/2013 | Pope |
| 2015/0061833 | A1 | 3/2015 | Do et al. |
| 2015/0270719 | A1* | 9/2015 | Kurs ....................... H02J 5/005 320/108 |

OTHER PUBLICATIONS

Datasheet for NXP Semiconductors ICODE SLIX, Aug. 12, 2012, pp. 1-32.
Finkenzeller, RFID Handbook: Fundamentals and Applications in Contactless Smart Cards, Radio Frequency Identification and Near-Field Communication, 72-81, (2012).
"Introducing the AD-110m5 UHF RFID Inlay", [On line] [Retrieved on Mar. 16, 2014], URL <http://rfid.averydennison.com/ad-110m5/>, pp. 1-2.
Mohan, "Simple Accurate Expressions for Planar Spiral Inductances", IEEE Journal Of Solid-State Circuits, Oct. 1999, vol. 34, No. 10, pp. 1419-1424.
Near Field UHF Round Inlay / Label, SAG Securitag Assembly Group, (date unknown but believed to be prior to the date of the filing of the present application), pp. 1-2.
"Near Field UHF Round Inlay", SAG Securitag Assembly Group, [On line] [Retrieved on Mar. 16, 2014], URL <http://www.sag.com.tw/index.php?_Page=product&mode=show&cid=16?SetLang=en-us&pid=327&SetLang=en-us>, pp. 1.
"OMRON Introduces EPC Gen2 Global "Loop" Inlay—Versatile inlay ideal in material and orientation sensitive applications for worldwide frequency (860 to 960MHz) use", Omron Global, [On line] [Retrieved on Mar. 16, 2014], URL <http://www.omron.com/media/press/2006/07/n_110706.html>, pp. 3.
"UHF RFID Inlays AD-110m5", [On line] [Retrieved on Mar. 16, 2014], URL <http://rfid.averydennison.com/products/ad-110m5/>, pp. 1-3.
International Search Report for PCT International Application No. PCT/US2016/022887, dated Aug. 12, 2016, 6 pages.

\* cited by examiner

RADIO FREQUENCY IDENTIFICATION TAG

BACKGROUND

Electronics that may be worn or attached to the body are sometimes desired. For example, electronics attached to human skin may be used for monitoring health. Such electronics may include radio frequency identification (RFID) tags.

SUMMARY

In some aspects of the present description, a radio frequency identification (RFID) tag is provided that includes a substrate, an antenna disposed on a major surface of the substrate, an integrated circuit (IC) disposed on a major surface of the substrate, and one or more stand-alone capacitors apart from the IC disposed on a major surface of the substrate. The antenna has a length less than about 2 meters between first and second ends of the antenna. The IC has an effective capacitance less than about 1000 pF, and the one or more stand-alone capacitors have an equivalent capacitance greater than about 500 pF. The one or more stand-alone capacitors are electrically connected in parallel with the antenna and the IC.

In some aspects of the present description, a radio frequency identification (RFID) tag is provided that has a resonant frequency and a corresponding free space resonant wavelength and that is adapted to wirelessly communicate with a remote transceiver at or about at the resonant frequency. The RFID tag includes a substrate, an antenna disposed on a major surface of the substrate, an integrated circuit (IC) disposed on a major surface of the substrate, and one or more stand-alone capacitors disposed on a major surface of the substrate and connected in parallel with the antenna and the IC. The antenna has a length between first and second ends of the antenna less than about 0.1 times the free space resonant wavelength. The IC has an effective capacitance, the one or more stand-alone capacitors have an equivalent first capacitance and a ratio of the first capacitance to the effective capacitance is at least 4.

In some aspects of the present description, a radio frequency identification (RFID) tag is provided that has a free space resonant wavelength and that includes a substrate, an antenna disposed on a major surface of the substrate, and an integrated circuit (IC) electrically coupled to the antenna. The antenna includes a conductive trace extending along a length of the antenna between first and second ends of the antenna. When the RFID tag is laid flat, an imaginary straight line connecting the first and second ends of the antenna intersects the conductive trace at no more than five other locations, and a ratio of a largest lateral dimension of a smallest perimeter enclosing the antenna to the free space resonant wavelength is not greater than about 0.1.

In some aspects of the present description, a radio frequency identification (RFID) tag is provided that includes a substrate, an antenna, and an integrated circuit (IC) disposed on the substrate and electrically coupled to the antenna. The antenna has one or more loops disposed on a first major surface of the substrate and extending along a length of the antenna between first and second ends of the antenna. When the RFID tag is laid flat, a largest area enclosed by an innermost loop of the antenna has a first area, a smallest area enclosing an outermost loop of the antenna has a second area, and a loop in the one or more loops has a top surface having a third area. A ratio of the difference between the second and first areas to the third area is less than about 4.

In some aspects of the present description, a radio frequency identification (RFID) tag is provided that is adapted to minimize an effect due to a maximum local parasitic capacitance. The RFID tag includes a substrate, an antenna disposed on a major surface of the substrate and having a length between first and second ends of the antenna, an integrated circuit (IC) disposed on a major surface of the substrate and having an effective capacitance, and one or more stand-alone capacitors apart from the IC disposed on a major surface of the substrate and connected in parallel with the antenna and the IC. The one or more stand-alone capacitors have an equivalent first capacitance and a parallel sum of the effective capacitance and the first capacitance is at least 4 times the maximum local parasitic capacitance.

In some aspects of the present description, a radio frequency identification (RFID) tag is provided that has an effective tag capacitance and that includes a substrate, an antenna disposed on a major surface of the substrate, an integrated circuit (IC) disposed on a major surface of the substrate and having an effective first capacitance, and one or more stand-alone capacitors apart from the IC disposed on a major surface of the substrate and electrically connected in parallel with the antenna and the IC. The effective tag capacitance is greater than the effective first capacitance.

In some aspects of the present description, a radio frequency identification (RFID) tag is provided that has a free space resonant wavelength and that is adapted to minimize an effect due to a maximum local parasitic capacitance. The RFID tag includes a flexible substrate, an antenna formed on a major surface of the substrate, and one or more stand-alone capacitors disposed on a major surface of the substrate and electrically coupled to the antenna. The antenna includes a conductive trace extending along a length of the antenna between first and second ends of the antenna. The length of the antenna is less than about 0.1 times the free space resonant wavelength. The one or more stand-alone capacitors have an equivalent capacitance greater than about 10 pF.

In some aspects of the present description, a radio frequency identification (RFID) tag is provided that has an effective capacitance greater than about 10 pF and that includes a single loop antenna disposed on a major surface of a flexible substrate.

In some aspects of the present description, a radio frequency identification (RFID) tag is provided that includes a substrate, an antenna having one or more loops disposed on a first major surface of the substrate, and one or more capacitors distinct from any integrated circuit (IC) that may be present on the substrate. The one or more loops of the antenna extend along a length of the antenna between first and second ends of the antenna. The length of the antenna is less than about 0.1 times a free space resonant wavelength of the RFID tag. The one or more capacitors are disposed on a major surface of the substrate and are electrically coupled to the antenna. When the antenna is laid flat, a largest area enclosed by an innermost loop of the antenna has a first area, a smallest area enclosing an outermost loop of the antenna has a second area, and a loop in the one or more loops has a top surface having a third area. The ratio of the difference between the second and first areas to the third area is less than about 4. The antenna includes a conductive trace having an average lateral width, and a ratio of a largest lateral dimension of a smallest perimeter enclosing the antenna to the average lateral width is in a range of 5 to 60.

DETAILED DESCRIPTION

Figure 1A:
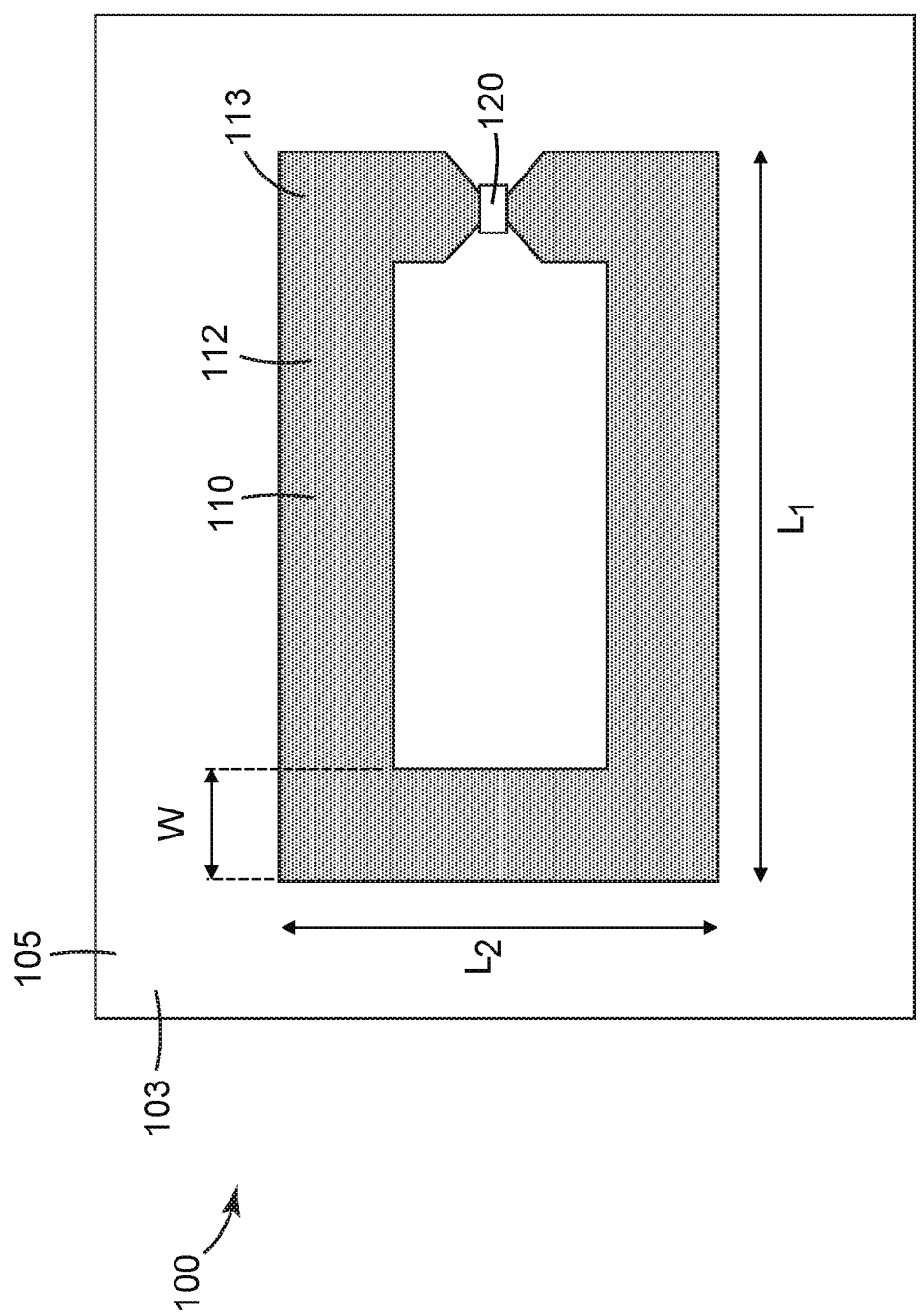
FIG. 1A is a top view of an RFID tag.

In the following description, reference is made to the accompanying drawings that forms a part hereof and in which are shown by way of illustration. The drawings are not necessarily to scale. It is to be understood that other embodiments are contemplated and may be made without departing from the scope or spirit of the present disclosure. The following detailed description, therefore, is not to be taken in a limiting sense.

It is sometimes desired to attach electronics to human skin. Such electronics includes radio frequency identification (RFID) tags that can be used, for example, for sensing, health monitoring, or authentication applications. For example, a person could attach an RFID tag to their skin which could then automatically provide the desired authentication via Near Field Communication (NFC) to an NFC-enabled computer, tablet, phone, or the like that the person may use. However, conventional RFID tags can perform poorly or unreliably when disposed on or near human tissue, such as skin or fat, due to the wide range of permittivity of human tissue under various hydration conditions. RFID tags of the present description are less sensitive to the state of the skin (e.g., dry or moist skin) of a person wearing the RFID tag so that consistent performance of the RFID tags can be achieved regardless of the state of the skin.

Conventional radio frequency identification tags typically include an antenna with many (e.g., more than a dozen) loops. According to the present description, it has been found that RFID tags having only one loop or having only a few loops can provide improved and more consistent performance when disposed on or near skin. Without intending to be limited by theory, it is believed that reducing the number of loops in an RFID antenna can reduce the inter-winding parasitic capacitance of the antenna and that the resulting RFID tag can be less sensitive to the effects of the permittivity of material (e.g., a human tissue) in proximity to the RFID tag. It has been found that the inter-winding parasitic capacitance can be reduced by reducing the reactance of the antenna and that this can be accomplished by reducing the number of turns of the antenna, and/or reducing the size of the antenna. The reactance of an antenna having a conductive trace can be further reduced by increasing the cross-sectional area of the conductive trace.

It is sometimes desired that the antenna have a resonance frequency of about 13 MHz (e.g., 13.56 MHz, or 13.56 MHz plus or minus 7 kHz) as this is commonly used in NFC. It has been found that, in some embodiments, a desired resonance frequency of a reduced-reactance antenna can be achieved by including one or more stand-alone capacitors connected in parallel with the antenna and with an integrated circuit (IC) included with the RFID tag. The frequency band at about 13.56 MHz is within a range sometimes referred to as a high frequency (HF) band. The RFID tags of the present description may have resonance frequencies in other bands. Suitable bands include, for example, the high frequency (HF) band from 3-30 MHz and the low frequency (LF) band from 120-150 kHz and the ultra-high frequency (UHF) bands at about 433 MHz, or 865-868 MHz, or 902-928 MHz. Suitable bands also include, for example, other industrial, scientific, and medical (ISM) radio bands such as those having frequencies of about 6.78 MHz, 27.12 MHz, or 40.68 MHz.

Useful sizes of the antennas of the RFID tags of the present description may vary depending on the desired resonant frequency of the RFID tag. Useful sizes may be such that a largest lateral dimension of a smallest perimeter enclosing the antenna is in a range of 8 mm, or 10 mm to 150 mm, or 200 mm, or 250 mm, for example. In some embodiments, the antenna may have a largest lateral dimension less than about 200 mm, less than about 100 mm, less than about 60 mm, or less than about 10 mm. In some embodiments, the antenna may have a largest lateral dimension in a range of about 1 mm to about 200 mm. In some embodiments, the antenna may have a first largest lateral dimension along a first direction and a second largest lateral dimension along a second direction, and the first and second largest lateral dimensions may independently be less than about 10 cm, less than about 8 cm, less than about 5 cm, less than about 2 cm, less than about 1 cm, or less than about 0.5 cm. In some embodiments, each of the first and second largest lateral dimensions are independently in a range of about 1 mm to about 200 mm, or in a range of about 15 mm to about 100 mm, or in a range of about 20 mm to about 50 mm.

In some embodiments, a radio frequency identification (RFID) tag of the present description includes a substrate that may be flexible, an antenna disposed on a major surface of the substrate, and one or more electrical components disposed on a major surface of the substrate and electrically connected to the antenna. The one or more electrical components may include an integrated circuit (IC) disposed on a major surface of the substrate and may include one or more stand-alone capacitors apart from the IC disposed on a major surface of the substrate. The one or more stand-alone capacitors may be electrically connected in parallel with the antenna and the IC. The IC may have an effective capacitance less than about 1000 pF, or less than about 500 pF, or less than about 200 pF, or less than about 150 pF, or less than about 100 pF, or less than about 50 pF, and may have an effective capacitance greater than 1 pF or greater than 5 pF. The one or more stand-alone capacitors may have an equivalent capacitance greater than about 10 pF, or greater than about 100 pF, or greater than about 500 pF, or greater than about 1 nF, or greater than about 2 nF, and may have an equivalent capacitance less than about 1 µF or less than about 10 µF. The one or more stand-alone capacitors having an equivalent first capacitance may include a single capacitor having the first capacitance or may include a plurality of capacitors electrically connected to provide an equivalent capacitance equal to the first capacitance, which may, for example, be in a range of about 10 pF to about 10 µF. If a plurality of capacitors are included, the capacitors may be electrically connected together in any suitable way. In some embodiments, the plurality of capacitors may be connected in parallel, or in series, or a combination of parallel and series connections may be used.

In some embodiments, an RFID tag of the present description may be adapted to minimize an effect due to a local parasitic capacitance. The RFID tag may be so adapted, for example, by limiting the number of loops of the conductive trace of the antenna (for example, one, two or three loops), using a conductive trace having a large cross-sectional area (for example, greater than 100 micrometers squared), and/or by including an appropriate stand-alone capacitor or a plurality of stand-alone capacitors to provide a desired resonant frequency. In some embodiments, the IC may have an effective capacitance and the one or more stand-alone capacitors may have an equivalent first capacitance. A parallel sum of the effective capacitance and the first capacitance may be at least 4, or at least 7, or at least 10, or at least 12 times the maximum local parasitic capacitance.

The maximum local parasitic capacitance may be affected by human skin or tissue when the RFID tag is worn. The permittivity of human skin or tissue may vary spatially and/or temporally. For example, the permittivity (i.e., relative permittivity) of skin may vary in the range of 20 to 60 or may vary in even broader ranges, depending on the state of skin (e.g., hydration level of the skin). In some embodiments, a source of the maximum local parasitic capacitance includes a time-varying and/or a spatially-varying permittivity. In some embodiments, a source of the maximum local parasitic capacitance includes a permittivity greater than about 4, or greater than about 6, or greater than about 10, or greater than about 15, or greater than about 20. The permittivity may be determined at a frequency of interest, which may be the free-space resonant frequency of the antenna (e.g., 13.56 MHz). In some embodiments, the RFID tag may be used in an environment having one or both of a time- and spatially-varying permittivity, such that a change in the permittivity of about 50% results in a change in resonant frequency of the RFID tag of less than about 5%, or less than about 2%, or less than about 1%.

The RFID tag may be adapted to minimize an effect due to a maximum local parasitic capacitance and may include one or more stand-alone capacitors electrically coupled to an RFID antenna. The one or more stand-alone capacitors may have an equivalent capacitance greater than 10 pF, for example, and may have an equivalent capacitance in any of the ranges described elsewhere. In some embodiments, the equivalent capacitance of the one or more stand-alone capacitors is at least 3 times, or at least 3.5 times, or at least 4 times, or at least 5 times the maximum local parasitic capacitance. In some embodiments, the equivalent capacitance of the one or more stand-alone capacitors is in a range of 3 times to 1000 times the maximum local parasitic capacitance.

In some embodiments, an RFID tag of the present description may include an antenna disposed on a major surface of a substrate, an IC disposed on a major surface of the substrate, and one or more stand-alone capacitors apart from the IC disposed on a major surface of the substrate. The IC may have an effective first capacitance and the one or more stand-alone capacitors may be connected in parallel with the antenna and the IC. The RFID tag may have an effective tag capacitance greater than the effective first capacitance. The ratio of the effective tag capacitance to the effective first capacitance may be greater than about 1.5, or greater than about 3, or may be greater than about 5, or may be greater than about 10. In some embodiments, the ratio of the effective tag capacitance to the effective first capacitance may be in a range of 1.1 to 2000 or to 5000.

In some embodiments, an RFID tag of the present description may have an effective capacitance greater than about 10 pF, or greater than about 20 pF, or greater than about 50 pF, or greater than about 100 pF, or greater than about 200 pF, or greater than about 500 pF. In some embodiments, the effective capacitance is in the range of about 10 pF to about 1 µF. In some embodiments, the effective capacitance of the RFID tag may be adjusted by including one or more stand-alone capacitors disposed on a major surface of a substrate. The one or more stand-alone capacitors may be electrically connected to an antenna disposed on a major surface of the substrate. In some embodiments, the one or more stand-alone capacitors, the antenna, and IC are electrically connected in parallel. The one or more stand-alone capacitors may have an equivalent capacitance in any of the ranges described elsewhere and may be a single capacitor or may include a plurality of individual capacitors electrically connected to provide a desired equivalent capacitance.

In some embodiments, an RFID tag of the present description may include an antenna with a quality factor (Q factor) greater than about 35, or greater than about 40, or greater than about 45, or greater than about 50. In some embodiments, the antenna may have a Q factor in the range of about 35 to about 90.

Figure 1B:
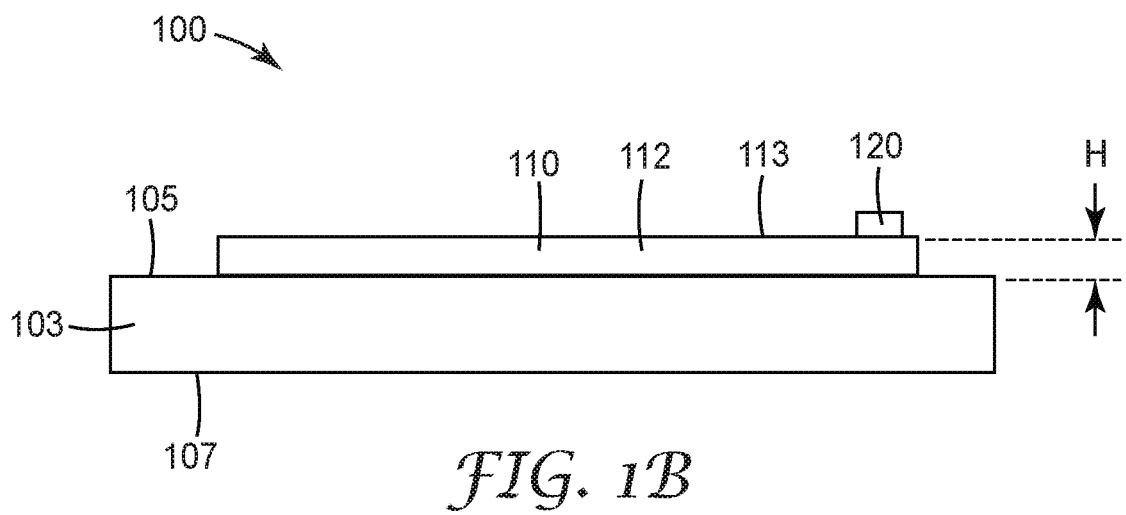
FIG. 1B is a side view of the RFID tag of FIG. 1A.

FIGS. 1A-1B are schematic top and side views, respectively, of radio frequency identification tag 100 including substrate 103 having first major surface 105, opposing second major surface 107 (see FIG. 1B), and antenna 110 disposed on first major surface 105. Antenna 110 includes electrically conductive trace 112 forming a single loop. Electrically conductive trace 112 has a top surface 113. RFID tag 100 further includes electrical component 120 disposed on first major surface 105 and connected to first and second ends of antenna 110. Electrical component 120 may include an integrated circuit and may include a stand-alone capacitor or a plurality of stand-alone capacitors. In alternate embodiments, electrical component 120 may be disposed on second major surface 107 and connected to antenna 110 through substrate 103.

The conductive trace 112 extends along the length of the antenna 110 between the first and second end of the antenna 110. The conductive trace 112 has a width W along a direction parallel to the substrate 103 and a height H along a direction perpendicular to the substrate 103. The width W of conductive trace 112, or the width of a conductive trace of any of the antennas of the present description, may be greater than 50 micrometers, or greater than 100 micrometers, or greater than 150 micrometers, and may be less than 1 mm or less than 5 mm. The average lateral width of the conductive trace 112 is approximately the width W since the conductive trace 112 has this width over most of the length of the trace. The height H of conductive trace 112, or the height of a conductive trace of any of the antennas of the present description, may be greater than about 0.5 micrometers, or greater than about 1 micrometers, or greater than 2 micrometers, and may be less than 100 micrometers or 200 micrometers. The conductive trace may have a minimum cross-sectional area (e.g., W times H) greater than about 100 micrometers squared or greater than about 500 micrometers squared, or greater than about 1000 micrometers squared, or greater than about 2000 micrometers squared and the minimum cross-sectional area may be less than about $10^6$ micrometers squared, or less than about $10^5$ micrometers squared, or less than about 80000 micrometers squared, or less than about 70000 micrometers squared. The antenna 110, or any of the antennas of the present description, may have a length less than about 2 meters, or less than about 1 meter, or less than about 0.5 meters, or less than about 0.2 meters, and may have a length greater than 0.1 cm, or greater than 0.5 cm, or greater than 1 cm.

The antennas of the present description may have a largest lateral dimension along a first direction and a largest lateral dimension along a second direction which is perpendicular to the first direction. The antenna 110 has a largest lateral dimension $L_1$ along a first direction and a largest lateral dimension $L_2$ along a second direction which is perpendicular to the first direction. A largest lateral dimension of the antenna 110, or of any antennas of the present description, may be less than about 200 mm, or less than about 100 mm, or less than about 60 mm, or less than about 10 mm, and may be greater than 0.5 mm, or greater than 1 mm, or greater than 2 mm. In some embodiments, one or both of the largest lateral dimension along a first direction and a largest lateral dimension along a second direction (e.g., $L_1$ and $L_2$) may independently be less than about 10 cm, or less than about 8 cm, or less than about 5 cm, or less than about 2 cm, or less than about 1 cm, or less than about 0.5 cm, and one or both of $L_1$ and $L_2$ may independently be greater than 0.5 mm, or greater than 1 mm, or greater than 2 mm. In some embodiments, a largest lateral dimension of a smallest perimeter of the antenna may be in a range of about 1 mm to about 200 mm, or in a range of about 15 mm to about 100 mm, or in a range of about 20 mm to about 50 mm.

In some embodiments, an RFID tag includes a substrate, an antenna disposed on a major surface of the substrate, an IC having an effective capacitance and disposed on a major surface of the substrate, and one or more stand-alone capacitors having an equivalent first capacitance and disposed on a major surface of the substrate and connected in parallel with the antenna and the IC. The RFID tag has a resonant frequency and a corresponding free space resonant wavelength. The RFID tag may be adapted to wirelessly communicate with a remote transceiver at or about at the resonant frequency. An RFID tag adapted to wirelessly communicate with a remote transceiver at the resonant frequency may also be able to communicate with remote transceivers at frequencies in some frequency range close to the resonant frequency (e.g., at a frequency in the range of 13.56 MHz plus or minus 7 kHz). The antenna may have a length between first and second ends of the antenna that is less than about 0.2 times the free space resonant wavelength, or less than about 0.1 times the free space resonant wavelength, or less than about 0.05 times the free space resonant wavelength, and the length may be greater than about 0.001 or 0.005 times the free space resonant wavelength.

In some embodiments, the ratio of the first capacitance to the effective capacitance may be at least 4, or at least 6, or at least 10, or at least 15, or at least 20, or at least 30, and may be less than 5000, or less than 1000, or less than 500. The dimensions and the number of turns of the antenna may be in any of the ranges described elsewhere.

In some embodiments, the antenna includes a conductive trace extending along a length of the antenna between first and second ends of the antenna. In some embodiments, a ratio of a largest lateral dimension of a smallest perimeter enclosing the antenna to the free space resonant wavelength is not greater than about 0.2, or not greater than about 0.1, or not greater than about 0.05, and may be greater than about 0.001, or greater than about 0.005.

Figure 2:
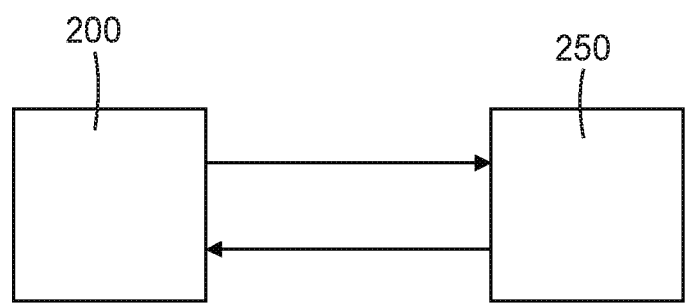
FIG. 2 is a schematic illustration of an RFID tag adapted to wirelessly communicate with a remote transceiver.

The RFID tag may be adapted to communicate with a remote transceiver at or about at the resonant wavelength. FIG. 2 schematically illustrates RFID tag 200 which is adapted to wirelessly communicate with remote transceiver 250. RFID tag 200 may include an antenna disposed on a substrate and may include one or more stand-alone capacitors electrically connected in parallel to the antenna and an IC as described elsewhere. RFID tag 200 may have a resonance frequency and may communicate with transceiver 250 at or about at the resonant frequency. RFID tag 200 may be configured to operate according any NFC standard, such as ISO/IEC 18092, ECMA-340, or ECMA-352, for example. Other suitable standards include ISO/IEC 15693, ISO/IEC 14443, ISO/IEC 18000-3, or NFC Forum specifications.

Antennas suitable for use in RFID tags of the present description can be made by laminating a metallic foil onto a substrate. For example, a copper foil or an aluminum foil and a polymer film can be heat laminated together. Suitable polymer films include elastomeric polyurethane, co-polyester, or polyether block amide films. In other embodiments, a material is extruded directly onto a metallic foil forming a substrate layer attached to the metallic foil. For example, a polyurethane resin may be extruded onto a copper foil. In other embodiments, a material, such as a urethane, is solvent coated onto a metallic foil. Once the metallic foil has been attached to a substrate or once a substrate layer has been formed on the metallic foil, the metallic foil may then be patterned using conventional wet etching techniques to produce an antenna disposed on a major surface of the substrate. Alternatively, the antenna may be formed through a milling process. The metallic foil may have a thickness in the range of about 0.5 micrometers or about 1 micrometer to about 100 micrometers or to about 200 micrometers, and the substrate may have a thickness in the range of about 1 micrometer or about 10 micrometers to about 1 mm or to about 2 mm.

In some embodiments, the antenna may include only one loop and in some embodiments the antenna may include more than one loop. In some embodiments, an RFID tag having a free space resonant wavelength includes a substrate, an antenna having a conductive trace extending along a length of the antenna between first and second ends of the antenna disposed on a major surface of the substrate, and an IC electrically coupled to the antenna. When the RFID tag is laid flat, an imaginary straight line connecting the first and second ends of the antenna may intersect the conductive trace at no more than five locations other than the first and second ends, or no more than four locations other than the first and second ends, or no more than three locations other than the first and second ends, or no more than two locations other than the first and second ends, or no more than one location other than the first and second ends. In some embodiments, the imaginary straight line connecting the first and second ends of the antenna does not intersect the conductive trace at any location other than the first and second ends of the antenna. In some embodiments, when the antenna is laid flat, a ratio of the diameter of a smallest circle enclosing the entire conductive trace to the free space resonant wavelength is not greater than about 0.1, or not greater than about 0.05, or not greater than about 0.02, and may be greater than about 0.0001. For example, referring to FIG. 1A, the smallest circle enclosing the entire conductive trace 112 is a circle having a diameter given by the square root of $L_1$ squared plus $L_2$ squared. The geometry can also be described in terms of a smallest perimeter enclosing the antenna. In some embodiments, when the antenna is laid flat, a ratio of a largest lateral dimension of a smallest perimeter enclosing the antenna to the free space resonant wavelength is not greater than about 0.1, or not greater than about 0.05, or not greater than about 0.02, and may be greater than about 0.0001. For example, referring to FIG. 1A, the smallest perimeter enclosing antenna 110 is an approximately rectangular region having a largest lateral dimension given by the square root of $L_1$ squared plus $L_2$ squared.

Figure 3A:
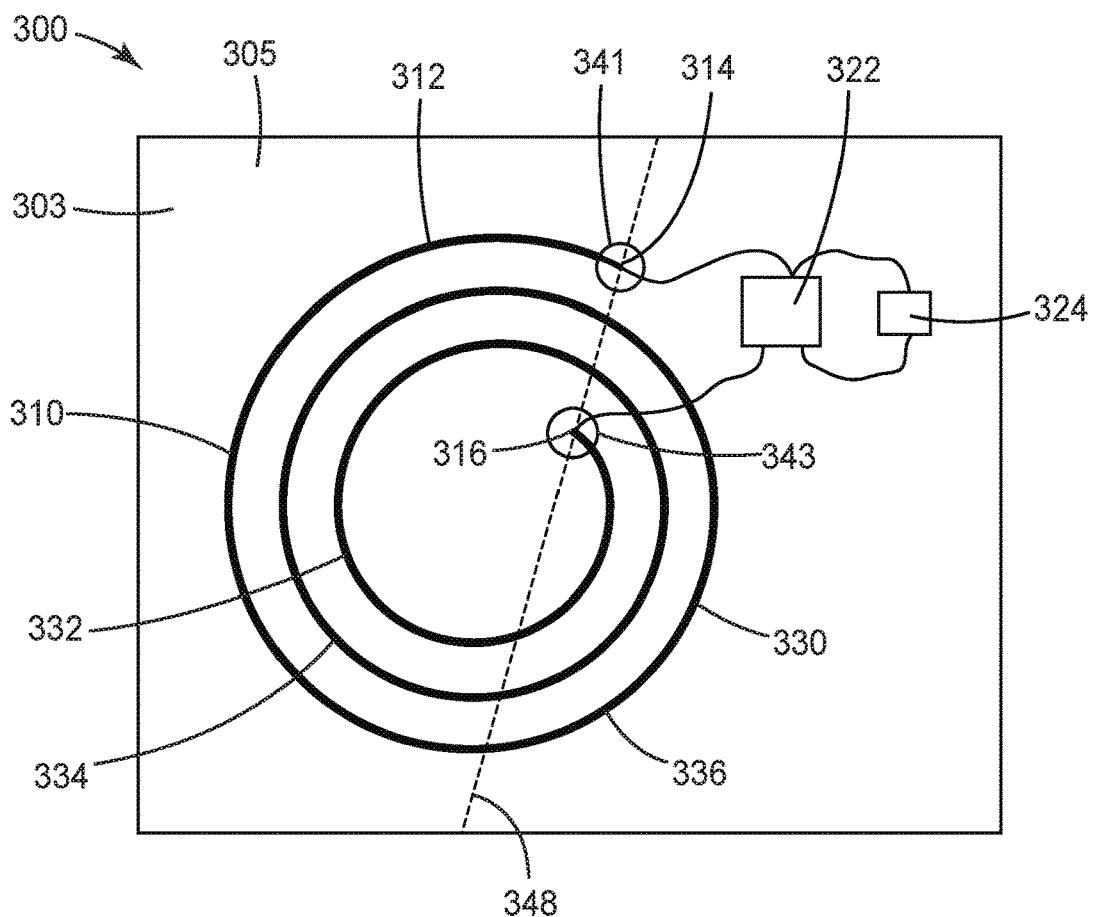
FIG. 3A is a top view of an RFID tag.
Figure 3B:
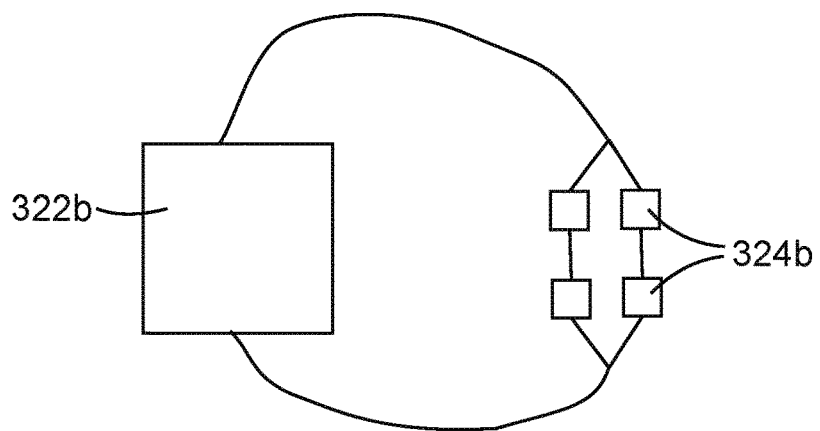
FIG. 3B is a top view of an integrated circuit and a plurality of stand-alone capacitors.

FIG. 3A is a top view of RFID tag 300 including antenna 310 disposed on a major surface 305 of substrate 303, IC 322 disposed on major surface 305, stand-alone capacitor 324 disposed on major surface 305, and first and second terminals 341 and 343 disposed on major surface 305. In alternate embodiments, one or more of the IC 322 and the stand-alone capacitor 324 may be disposed on the major surface of substrate 303 opposite major surface 305. Antenna 310 includes electrically conductive trace 312 and has first and second ends 314 and 316 which are in electrical communication with first and second terminals 341 and 343, respectively. Antenna 310 includes innermost loop 332, outermost loop 336, and interior loop 334 between innermost loop 332 and outermost loop 336. Stand-alone capacitor 324 is electrically connected in parallel to IC 322 and antenna 310. In the embodiment illustrated in FIG. 3A, stand-alone capacitor 324 is a single capacitor. In other embodiments, a plurality of capacitors may be used in place of stand-alone capacitor 324. This is illustrated in FIG. 3B which shows a plurality of stand-alone capacitors 324b electrically connected together and electrically connected to IC 322b. The plurality of capacitors may be electrically connected together (e.g., connected in parallel, or connected in series, or connected using a combination of parallel and series connections) to produce a desired equivalent capacitance.

Stand-alone capacitor 324, IC 322 and antenna 310 may be electrically connected using wires between the first and second terminals 341 and 343 and the IC 322 and wires between the IC 322 and the stand-alone capacitor 324. An insulating layer may be disposed over antenna 310 to prevent the wires from contacting any of the loops of the antenna 310.

Imaginary straight line 348 connects the first and second ends 314 and 316 of antenna 310 and intersects antenna 310 at five other locations when RFID tag 300 is laid flat. The number of locations in addition to the first and second ends 314 and 316 where imaginary straight line 348 intersects antenna 310 can be adjusted by adjusting the number of loops of antenna 310. In some embodiments, an imaginary straight line connecting the first and second ends of an antenna intersects the conductive trace of the antenna at the first and second ends of the antenna and at no more than five other locations, or at no more than four other locations, or at no more than three other locations, or at no more than two other locations, or at no more than one other location, or at no other locations.

Figure 4:
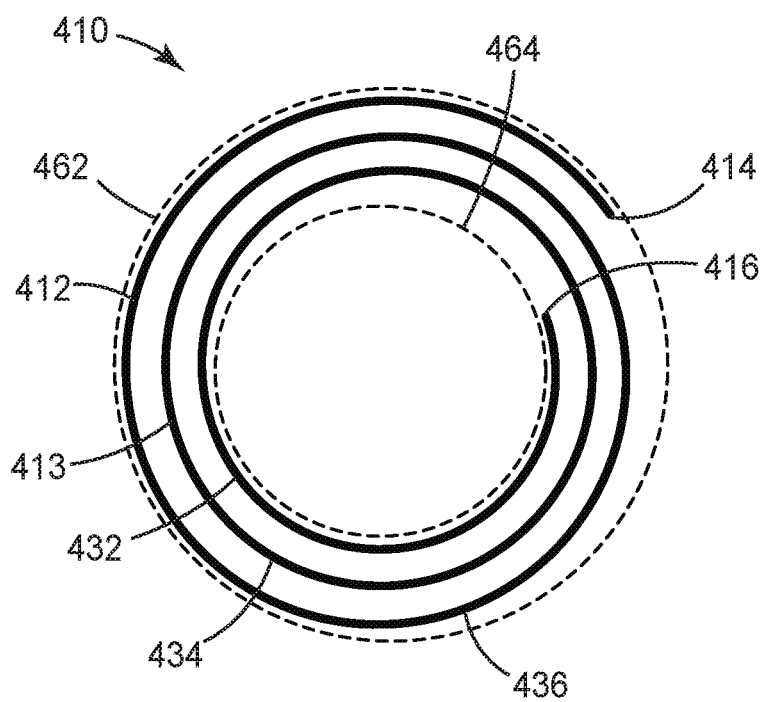
FIG. 4 is a top view of an antenna.

FIG. 4 is a top view of antenna 410 which includes electrically conductive trace 412 and has first and second ends 414 and 416. Electrically conductive trace 412 has a top surface 413. Antenna 410 includes innermost loop 432, outermost loop 436, and interior loop 434 between innermost loop 432 and outermost loop 436. Circle 462 is approximately the smallest circle that can enclose the conductive trace 412. Circle 464 is approximately the largest circle that is enclosed by the conductive trace 412. A largest area enclosed by innermost loop 432 is approximately the area of circle 464 or, more precisely, the largest area enclosed by innermost loop 432 is the area of circle 464 plus the area between circle 464 and innermost loop 432. A smallest area enclosing the outermost loop 436 is approximately the area of circle 462 or, more precisely, the area circle 462 minus the area between the outermost loop 436 and circle 462. Circle 462 is also approximately the smallest perimeter enclosing antenna 410. The largest lateral dimension of the smallest perimeter enclosing antenna 410 is approximately the diameter of circle 462. In other embodiments, the largest area enclosed by the innermost loop is not a circular area and the smallest area enclosing the outermost loop is not a circular area. For example, in FIG. 1A, the largest area enclosed by the innermost loop, which is the single loop in this case, is the approximately rectangular area inside conductive trace 112 and the smallest area enclosed by the outermost loop, which is also the single loop in this case, is the approximately rectangular area enclosing conductive trace 112.

In some embodiments, an RFID antenna includes a substrate, an antenna having one or more loops disposed on a first major surface of the substrate and extending along a length of the antenna between first and second ends of the antenna, and an integrated circuit (IC) disposed on the substrate and electrically coupled to the antenna, such than when the RFID tag is laid flat, a largest area enclosed by an innermost loop of the antenna has a first area, a smallest area enclosing an outermost loop of the antenna has a second area, a loop in the one or more loops has a top surface having a third area. The ratio of the difference between the second area and the first area to the third area may be less than about 4, or less than about 3.5, or less than about 3. For example, referring to FIG. 4, the first area may correspond to approximately the area of circle 464, the second area may correspond to approximately the area of circle 462, and the third area may correspond to approximately a circumference of the interior loop 434 times a width of the electrically conductive trace 412. In embodiments where interior loop 434 is an approximately circular loop with an outer diameter and an inner diameter, the third area may be approximately $\pi/4$ times the difference of the square of the outer diameter and the square of the inner diameter. The loop in the one or more loops having the third area may be any loop. For example, the loop may be the outermost loop, or it may be the innermost loop, or it may be an interior loop. In embodiments that include a single loop, the second area minus the first area may be equal to the third area so that the ratio of the difference between the second and first areas to the third area may be equal to one. In some embodiments, a ratio of the second area to the third area may be greater than 1.2, or greater than 1.5, or greater than 1.75, or greater than 2.0, and may be less than 16, or less than 12, or less than 10, or less than 9. Ratios between about 1.2 and about 16 have been found to give desirably high induced voltage and/or desirably high Q factors. In some embodiments, a ratio of the largest lateral dimension of a smallest perimeter enclosing the antenna to the average lateral width of the conductive trace maybe greater than 5, or greater than 7.5 and may be less than 60, or less than 45, or less than 30. Ratios between about 5 and about 60 have been found to give desirably high induced voltage and/or desirably high Q factors.

In any of the embodiments of the present description, the antenna, the IC and the one or more stand-alone capacitors may be disposed on a same major surface of the substrate. In some embodiments, some or all of the one or more stand-alone capacitors and/or the IC may be disposed on a major surface of the substrate opposite the antenna. In some embodiments, the IC and/or the one or more stand-alone capacitors may be disposed directly on a major surface of the substrate and in some embodiments, the IC and/or the one or more stand-alone capacitors may be disposed indirectly on a major surface of the substrate through one or more layers separating the IC and/or the one or more stand-alone capacitors from the substrate.

Electrical connection between the IC, the antenna, and/or the one or more stand-alone capacitors can be made by crimping or by using conductive paste or adhesive to attach electrically conductive wiring. Crimp connections may be performed using a heated crimping process which can connect components on the same side or on opposite sides of a substrate. A heated tool can be used to melt through a substrate layer or substrate layers and then a crimp tool can be used to provide metal to metal contact through the melted substrate layer or substrate layers. Alternatively, the crimp tool itself may be heated in order to melt through any substrate layers and improve metal to metal contact in the crimped connection.

In any of the embodiments of the present description, the substrate may be a flexible substrate and/or may be a polymeric substrate. Suitable substrates include polyimide; polyurethane, such as elastomeric polyurethane; polyester, such as polyethylene terephthalate (PET); co-polyester; or polyether block amide films. In some embodiments, the substrate, which may be a polymeric substrate, is sufficiently flexible that it can be wrapped around a cylindrical mandrel having a 3 cm diameter, or a 2 cm diameter, or a 1 cm diameter, without cracking or crazing. The substrate may be stretchable. For example, the substrate may be stretchable along a first direction up to about 1.5 times an original unstretched dimension of the substrate without tearing. In some embodiments, the substrate is stretchable along a first direction up to at least about 1.3 times, or at least about 1.5 times, or at least about 1.75 times an original unstretched dimension of the substrate without tearing.

Any of the RFID tags described herein may be attached to skin using a suitable adhesive. Suitable adhesives include hypoallergenic acrylate copolymer bioadhesives such as those described in U.S. Pat. No. 5,088,483 (Heinecke).

Figure 5:
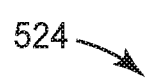
FIG. 5 is a schematic cross-sectional view of a capacitor.

In any of the embodiments of the present description, one or more stand-alone capacitors may be included. The one or more stand-alone capacitors may be a single capacitor or the one or more stand-alone capacitors may include a plurality of capacitors electrically connected together to provide a desired equivalent capacitance. The plurality of capacitors may be electrically connected in parallel or in series, for example, or a combination of parallel and series connections may be used. Any or all of the one or more stand-alone capacitors can be any suitable type of capacitor and may include, for example, a material disposed between two electrode layers. This is illustrated in FIG. 5 which is a schematic cross-sectional view of a stand-alone capacitor 524 including first and second electrodes 572 and 574 and including material 577 disposed between first and second electrodes 572 and 574. The material 577 may include one or more dielectric layers. Suitable dielectric layers include ceramic layers. Suitable capacitors include ceramic disc capacitors and multilayer ceramic capacitors (MLCC) which may be described as including a plurality of ceramic layers and a plurality of metallic layers disposed between outermost metallic layers. Other suitable capacitors include film capacitors, which include insulating plastic film as the dielectric material, and silicon capacitors, which can provide a high and stable capacitance (e.g., low sensitivity to temperature and negligible change in capacitance over time).

EXAMPLES

Example 1

A single turn antenna similar to that shown in FIG. 1A was modeled using CST EM Simulation Software (available from CST of America®, Inc., Framingham, Mass.). The conductive trace of the antenna was modeled as a copper trace with a thickness of 10 μm and a width of 3.25 mm contained within a 10 mm by 17 mm rectangle. The copper was modeled as having a conductivity of $5.8 \times 10^7$ S/m. The substrate was modeled as a 12×18 mm×50 μm thick sheet having a relative permittivity of 3.2 and a loss tangent of 0.0029. Modeling was performed for both the case where the substrate was in free space and the case where the substrate was in contact with a human body. The human body was modeled as a rectangular block of skin 14 mm×20 mm×4 mm thick, with a relative permittivity of 30 and a conductivity of 8 S/m. The skin was in direct contact with the back of the substrate. An electrical component was included at the ends of the antenna and was modeled as a 10 nF capacitor in parallel with a 1 k ohm resistor to simulate an NFC IC having an effective capacitance of 50 pF connected in parallel to a stand-alone capacitor having a capacitance chosen to produce an overall effective capacitance of 10 nF.

The modeled reader antenna was a round 20 mm diameter antenna with a 0.5 mm diameter circular cross section, coaxially spaced 10 mm from the RFID tag antenna. The reader antenna was driven to provide a 1 amp-turn field 10 mm from the RFID tag.

The resulting quality factor (Q) and the shift in the resonant frequency resulting from placing the RFID tag on skin was determined and is reported in Table 1.

Comparative Example C-1

A 14-turn (i.e., 14 loops) antenna was modeled as in Example 1. The antenna was modeled as a 14-turn copper trace with a thickness of 10 μm, a pitch of 230 μm, a trace width of 115 μm, inside a 10 by 17 mm rectangle, on the 50 μm thick substrate modeled in Example 1. An electrical component was included at the ends of the antenna and was modeled as a 50 pF capacitor in parallel with a 1 k ohm resistor to provide a resonance frequency similar to that of Example 1. The resulting quality factor (Q) and the shift in the resonant frequency resulting from placing the RFID tag on skin was determined as in Example 1 and is reported in Table 1.

TABLE 1

| Example | Number of Turns | Environment | Q | % Frequency Shift |
|---------|----------------|-------------|-----|-------------------|
| C-1 | 14 | In free space | 66 | Reference value |
| C-1 | 14 | On skin | 47 | Down 6% |
| 1 | 1 | In free space | 79 | Reference value |
| 1 | 1 | On skin | 73 | <0.5% |

The 14-turn RFID tag of Comparative Example C-1 showed a significant drop in resonance frequency and Q factor when placed on skin, while the single turn RFID tag of Example 1 did not. The simulation results provided the resonant frequency to the nearest 100 kHz, limiting the simulated resonant frequency precision to about 0.5%. In the case of the single-turn tag, a shift in resonant frequency was not detected within the precision of the simulation. The single-turn and multi-turn antennas delivered similar voltages to the NFC IC (6.8 volts for Example 1 and 6.5 volts for Comparative Example C-1).

Examples 2-7

Six circular, single-loop antennas were designed with a fixed outer diameter of 30 mm and with a trace width varying from 0.5 mm to 12 mm, corresponding to a ratio of outer diameter to trace width varying from 60:1 to 2.5:1. RFID tags incorporating the antennas also included pads connected at the ends of the antenna loop for a packaged integrated circuit (not populated) and up to 4 surface-mount capacitors of 0603 size. The ends of the antenna were separated by a gap of 3.5 mm. The antennas were fabricated by milling pre-fabricated copper-clad boards having a 35 μm thick copper layer on an FR4 fiberglass substrate (0.7874 mm substrate thickness).

The inductance of each antenna was measured with an HP4285A precision LCR meter and 16047E test fixture (both available from Agilent Technologies, Santa Clara, Calif.), at a fixed 10 mA input current at 13.56 MHz. The measured inductances are reported in Table 2. Stranded wire leads (22 AWG) with 12 mm length were temporarily soldered in place for the measurements, and the effect of the leads was approximately subtracted by a measurement of a 25 mm long piece of similar wire, yielding 10.1 nH.

Each antenna was tuned to resonate near 13.56 MHz using one to four parallel stand-alone capacitors having the equivalent capacitance values shown in the "Equivalent Capacitance" column of Table 2. The capacitors were ceramic surface-mount 0603-sized NP0 type with 1% tolerance (obtained from Digikey, Thief River Falls, Minn.). In some cases, the capacitors were selected iteratively to precisely adjust the resonant frequency to the values shown in Table 2.

Resonant frequency and quality factor Q were measured wirelessly by a vector network analyzer (miniVNA-Pro, Mini Radio Solutions, Poland) and reader antenna attached to the vector network analyzer by 30 cm (1 foot) of 50 ohm RG174 coaxial cable with SMA-type connectors. The reader antenna was implemented on a FR4 printed circuit board where the antenna was 2 turns of copper traces with a 5.08 cm (2 inch) inner diameter, 1.02 mm (0.04 inch) trace width, and 0.25 mm (0.01 inch) spacing between traces, and a surface-mount SMA-type connector. This yielded an antenna inductance of about 500 nH and a self-resonant frequency of about 38 MHz, which was significantly above the resonance of the tags being measured. The PC software used for operation of the vector network analyzer was "vna/J" version 2.8.6 f (Dietmar Krause, Filderstadt, Germany). Vector network analyzer measurements yielded complex impedance Z, which was split into its real and imaginary parts, resistance R and reactance X, respectively. Measurement of the reader antenna alone gave a baseline complex impedance that was vector subtracted from each tag antenna measurement. The resulting reflected tag impedance had a peak magnitude of impedance at resonance that was entirely real (resistive); this was recorded as the resonant frequency. The ratio of the resonant frequency to the width of the peak was recorded as the resonance quality factor Q. The width of the peak was determined from resistance (full-width at half maximum of resistance) and could also have been obtained from the magnitude of the impedance (full-width at 0.707 of maximum of impedance magnitude). Measured values of resonant frequency and Q reported in Table 2 were determined at a fixed separation distance of 20 mm between reader antenna and tag antenna. To check for coupling effects, each of these tag antennas were also measured across a range of separation distance from 6 mm to 30 mm, with minimal change in observed resonant frequency (less than 0.2% change) or Q (less than 1% change).

TABLE 2

| Example | Trace width (mm) | Measured inductance (nH) | Equivalent capacitance (pF) | Measured resonant frequency (MHz) | Measured quality factor, Q |
|---|---|---|---|---|---|
| 2 | 0.5 | 93.0 | 1500 | 13.55 | 39.9 |
| 3 | 1.0 | 79.1 | 1767 | 13.56 | 57.5 |
| 4 | 2.0 | 65.1 | 2168 | 13.54 | 71.6 |
| 5 | 4.0 | 54.0 | 2900 | 13.57 | 73.8 |

TABLE 2-continued

| Example | Trace width (mm) | Measured inductance (nH) | Equivalent capacitance (pF) | Measured resonant frequency (MHz) | Measured quality factor, Q |
|---|---|---|---|---|---|
| 6 | 8.0 | 35.9 | 4540 | 13.55 | 61.7 |
| 7 | 12.0 | 24.3 | 6547 | 13.57 | 46.1 |

Resonant inductance L was calculated from tuning capacitance C and measured resonant frequency using the equation: resonant frequency=$1/(2\pi\sqrt{(L\ C)})$. Because these values of resonant inductance are not influenced by parasitic inductance of wire leads, these resonant inductance values are more accurate than values determined via the LCR meter. Resonant series resistance R was calculated from quality factor and resonant inductance using the equation for quality factor of an inductor with a series resistance loss, $2\pi f\ L/R$, for frequency f. These values of resistance were too small to directly measure accurately with the LCR meter method described elsewhere, so were obtained from measured Q only. The resulting resonant inductance and resonant series resistance values are reported in Table 3.

Induced voltage on each tag antenna was measured with an oscilloscope and low-capacitance active probe while in the field of a 13.56 MHz reader board at a fixed distance and position centered along the normal axis of the reader antenna. To access voltage, two short wires were soldered in place and twisted to minimize their inductance, and the wires were clipped to a TEKTRONIX TAP1500 probe and MSO3054 oscilloscope (both available from TEKTRONIX, Inc., Beaverton, Oreg.). The probe had an input impedance near 10 k ohm at the measurement frequency of 13.56 MHz. Voltage was induced by a ST Microelectronics CR95HF Demonstration reader board (obtained from Digikey with M24LR-DISCOVERY evaluation kit) at a fixed separation distance of 50 mm where the average magnetic field strength was determined to be 0.64 A/m RMS using a magnetic field probe (model 100C from Beehive Electronics, Sebastopol, Calif.) and spectrum analyzer (Agilent Technologies E4405B). Measured values of induced voltage for each design are given in Table 3. Table 3 also reports the ratio of the outer diameter of the antenna to the trace width and the ratio of the area of a smallest area enclosing the conductive trace of the antenna (denoted as area of the antenna in Table 3) to the surface area of the single loop of the trace.

TABLE 3

| Example | Trace width (mm) | Ratio of outer diameter to trace width | Ratio of area of antenna to surface area of trace | Resonant inductance (nH) | Resonant series resistance (ohm) | Induced voltage (V, RMS) |
|---|---|---|---|---|---|---|
| 2 | 0.5 | 60 | 15.25 | 92.0 | 0.196 | 1.73 |
| 3 | 1.0 | 30 | 7.76 | 78.0 | 0.116 | 2.42 |
| 4 | 2.0 | 15 | 4.02 | 63.7 | 0.076 | 2.64 |
| 5 | 4.0 | 7.5 | 2.16 | 47.5 | 0.055 | 2.49 |
| 6 | 8.0 | 3.75 | 1.28 | 30.4 | 0.042 | 1.48 |
| 7 | 12.0 | 2.5 | 1.04 | 21.0 | 0.039 | 0.71 |

The following is a list of exemplary embodiments of the present description.

Embodiment 1 is a radio frequency identification (RFID) tag comprising:
a substrate;
an antenna disposed on a major surface of the substrate and having a length less than about 2 meters between first and second ends of the antenna;
an integrated circuit (IC) disposed on a major surface of the substrate and having an effective capacitance less than about 1000 pF; and
one or more stand-alone capacitors apart from the IC disposed on a major surface of the substrate and having an equivalent capacitance greater than about 500 pF, the one or more stand-alone capacitors electrically connected in parallel with the antenna and the IC.

Embodiment 2 is the RFID tag of embodiment 1, wherein the one or more stand-alone capacitors has an equivalent capacitance greater than about 1 nF.

Embodiment 3 is the RFID tag of embodiment 1, wherein the one or more stand-alone capacitors has an equivalent capacitance greater than about 2 nF.

Embodiment 4 is the RFID tag of embodiment 1, wherein the antenna, the IC, and the one or more stand-alone capacitors are disposed on a same major surface of the substrate.

Embodiment 5 is the RFID tag of embodiment 1, wherein the substrate is flexible.

Embodiment 6 is the RFID tag of embodiment 1, wherein the substrate is stretchable along a first direction up to about 1.5 times an original unstretched dimension of the substrate without tearing.

Embodiment 7 is the RFID tag of embodiment 1, wherein the antenna comprises a single loop between the first and second ends of the antenna.

Embodiment 8 is the RFID tag of embodiment 1, wherein the length of the antenna is less than about 1 meter.

Embodiment 9 is the RFID tag of embodiment 1, wherein the length of the antenna is less than about 0.5 meters.

Embodiment 10 is the RFID tag of embodiment 1, wherein the length of the antenna is less than about 0.2 meters.

Embodiment 11 is the RFID tag of embodiment 1, wherein the effective capacitance of the IC is less than about 100 pF.

Embodiment 12 is the RFID tag of embodiment 1, wherein the effective capacitance of the IC is less than about 50 pF.

Embodiment 13 is the RFID tag of embodiment 1, wherein the antenna comprises one or more loops, each loop having a conductive trace having a thickness greater than about 1 micrometer along a direction normal to the substrate, and a width greater than about 100 micrometers along a direction parallel to the substrate.

Embodiment 14 is the RFID tag of embodiment 1, wherein the antenna comprises an electrically conductive trace extending along the length of the antenna between the first and second ends of the antenna, the electrically conductive trace having a minimum cross sectional area greater than about 100 micrometers squared.

Embodiment 15 is the RFID tag of embodiment 1, wherein at least one of the one or more stand-alone capacitors comprises one or more ceramic layers disposed between two electrode layers.

Embodiment 16 is the RFID tag of embodiment 1, wherein the effective capacitance of the IC is less than about 500 pF.

Embodiment 17 is the RFID tag of embodiment 1, wherein the effective capacitance of the IC is less than about 200 pF.

Embodiment 18 is the RFID tag of embodiment 1, wherein the effective capacitance of the IC is less than about 150 pF.

Embodiment 19 is the RFID tag of embodiment 1, wherein the substrate is flexible.

Embodiment 20 is the RFID tag of embodiment 1, wherein a largest lateral dimension of the antenna is less than about 200 mm.

Embodiment 21 is the RFID tag of embodiment 1, wherein a largest lateral dimension of the antenna is less than about 100 mm.

Embodiment 22 is the RFID tag of embodiment 1, wherein a largest lateral dimension of the antenna is less than about 60 mm.

Embodiment 23 is the RFID tag of embodiment 1, wherein a largest lateral dimension of the antenna is less than about 10 mm.

Embodiment 24 is the RFID tag of embodiment 1, wherein a largest lateral dimension of the antenna along a first direction is less than about 10 cm, and a largest lateral dimension of the antenna along a second direction, perpendicular to the first direction, is less than about 10 cm.

Embodiment 25 is the RFID tag of embodiment 1, wherein a largest lateral dimension of the antenna along a first direction is less than about 10 cm, and a largest lateral dimension of the antenna along a second direction, perpendicular to the first direction, is less than about 5 cm.

Embodiment 26 is the RFID tag of embodiment 1, wherein a largest lateral dimension of the antenna along a first direction is less than about 10 cm, and a largest lateral dimension of the antenna along a second direction, perpendicular to the first direction, is less than about 2 cm.

Embodiment 27 is the RFID tag of embodiment 1, wherein a largest lateral dimension of the antenna along a first direction is less than about 5 cm, and a largest lateral dimension of the antenna along a second direction, perpendicular to the first direction, is less than about 5 cm.

Embodiment 28 is the RFID tag of embodiment 1, wherein a largest lateral dimension of the antenna along a first direction is less than about 8 cm, and a largest lateral dimension of the antenna along a second direction, perpendicular to the first direction, is less than about 2 cm.

Embodiment 29 is the RFID tag of embodiment 1, wherein a largest lateral dimension of the antenna along a first direction is less than about 5 cm, and a largest lateral dimension of the antenna along a second direction, perpendicular to the first direction, is less than about 0.5 cm.

Embodiment 30 is the RFID tag of embodiment 1, wherein the antenna has a single loop comprising a conductive trace.

Embodiment 31 is the RFID tag of embodiment 1, wherein the antenna comprises a conductive trace having an average lateral width and a ratio of a largest lateral dimension of a smallest perimeter enclosing the antenna to the average lateral width is in a range of 5 to 60.

Embodiment 32 is the RFID tag of embodiment 31, wherein the ratio is in a range of 5 to 45.

Embodiment 33 is the RFID tag of embodiment 31, wherein the ratio is in a range of 7.5 to 30.

Embodiment 34 is the RFID tag of embodiment 1, wherein the antenna comprises an outermost loop having a top surface having a surface area and a ratio of a smallest area enclosing the outermost loop to the surface area is in a range of 1.2 to 16.

Embodiment 35 is the RFID tag of embodiment 34, wherein the ratio is in a range of 1.5 to 12.

Embodiment 36 is the RFID tag of embodiment 1, wherein the one or more stand-alone capacitors comprises a single capacitor having the equivalent capacitance.

Embodiment 37 is the RFID tag of embodiment 1, wherein the one or more stand-alone capacitors comprises a plurality of capacitors electrically connected together to provide the equivalent capacitance.

Embodiment 38 is the RFID tag of embodiment 37, wherein the plurality of capacitors are connected in parallel.

Embodiment 39 is the RFID tag of embodiment 37, wherein the plurality of capacitors are connected in series.

Embodiment 40 is a radio frequency identification (RFID) tag having a resonant frequency and a corresponding free space resonant wavelength, and adapted to wirelessly communicate with a remote transceiver at or about at the resonant frequency, the RFID tag comprising:
    a substrate;
    an antenna disposed on a major surface of the substrate and having a length between first and second ends of the antenna less than about 0.1 times the free space resonant wavelength;
    an integrated circuit (IC) disposed on a major surface of the substrate and having an effective capacitance; and
    one or more stand-alone capacitors having an equivalent first capacitance and disposed on a major surface of the substrate and connected in parallel with the antenna and the IC, a ratio of the first capacitance to the effective capacitance being at least 4.

Embodiment 41 is the RFID tag of embodiment 40, wherein the ratio of the first capacitance to the effective capacitance is at least 10.

Embodiment 42 is the RFID tag of embodiment 40, wherein the ratio of the first capacitance to the effective capacitance is at least 15.

Embodiment 43 is the RFID tag of embodiment 40, wherein the ratio of the first capacitance to the effective capacitance is at least 20.

Embodiment 44 is the RFID tag of embodiment 40, wherein the antenna, the IC, and the one or more stand-alone capacitors are disposed on a same major surface of the substrate.

Embodiment 45 is the RFID tag of embodiment 40, wherein the antenna comprises one or more loops, each loop having a conductive trace having a thickness greater than about 1 micrometer along a direction normal to the substrate, and a width greater than about 100 micrometers along a direction parallel to the substrate.

Embodiment 46 is the RFID tag of embodiment 40, wherein the antenna comprises an electrically conductive trace extending along the length of the antenna between the first and second ends of the antenna, the electrically conductive trace having a minimum cross sectional area greater than about 100 micrometers squared.

Embodiment 47 is the RFID tag of embodiment 40, wherein the substrate is flexible.

Embodiment 48 is the RFID tag of embodiment 40, wherein a largest lateral dimension of the antenna is less than about 200 mm.

Embodiment 49 is the RFID tag of embodiment 40, wherein a largest lateral dimension of the antenna is less than about 100 mm.

Embodiment 50 is the RFID tag of embodiment 40, wherein a largest lateral dimension of the antenna is less than about 60 mm.

Embodiment 51 is the RFID tag of embodiment 40, wherein a largest lateral dimension of the antenna is less than about 10 mm.

Embodiment 52 is the RFID tag of embodiment 40, wherein the antenna has a single loop.

Embodiment 53 is the RFID tag of embodiment 40, wherein the antenna comprises a conductive trace having an average lateral width and a ratio of a largest lateral dimension of a smallest perimeter enclosing the antenna to the average lateral width is in a range of 5 to 60.

Embodiment 54 is the RFID tag of embodiment 53, wherein the ratio of the largest lateral dimension of the smallest perimeter enclosing the antenna to the average lateral width is in a range of 5 to 45.

Embodiment 55 is the RFID tag of embodiment 53, wherein the ratio of the largest lateral dimension of the smallest perimeter enclosing the antenna to the average lateral width is in a range of 7.5 to 30.

Embodiment 56 is the RFID tag of embodiment 40, wherein the antenna comprises an outermost loop having a top surface having a surface area and a ratio of a smallest area enclosing the outermost loop to the surface area is in a range of 1.2 to 16.

Embodiment 57 is the RFID tag of embodiment 56, wherein the ratio of the smallest area enclosing the outermost loop to the surface area is in a range of 1.5 to 12.

Embodiment 58 is the RFID tag of embodiment 40, wherein the one or more stand-alone capacitors comprise a single capacitor having the first capacitance.

Embodiment 59 is the RFID tag of embodiment 40, wherein the one or more stand-alone capacitors comprise a plurality of capacitors electrically connected together to provide the equivalent first capacitance.

Embodiment 60 is the RFID tag of embodiment 59, wherein the plurality capacitors are connected in parallel.

Embodiment 61 is the RFID tag of embodiment 59, wherein the plurality of capacitors are connected in series.

Embodiment 62 is a radio frequency identification (RFID) tag having a free space resonant wavelength and comprising:
    a substrate;
    an antenna disposed on a major surface of the substrate and having a conductive trace extending along a length of the antenna between first and second ends of the antenna;
    an integrated circuit (IC) electrically coupled to the antenna;
    such that when the RFID tag is laid flat:
        an imaginary straight line connecting the first and second ends of the antenna intersects the conductive trace at no more than five other locations; and
        a ratio of a largest lateral dimension of a smallest perimeter enclosing the antenna to the free space resonant wavelength is not greater than about 0.1.

Embodiment 63 is the RFID tag of embodiment 62, wherein an imaginary straight line connecting the first and second ends of the antenna intersects the conductive trace at no more than four other locations.

Embodiment 64 is the RFID tag of embodiment 62, wherein the imaginary straight line intersects the conductive trace at no more than three other locations.

Embodiment 65 is the RFID tag of embodiment 62, wherein the imaginary straight line intersects the conductive trace at no more than two other locations.

Embodiment 66 is the RFID tag of embodiment 62, wherein the imaginary straight line intersects the conductive trace at no more than one other location.

Embodiment 67 is the RFID tag of embodiment 62, wherein the imaginary straight line intersects the conductive trace at no other locations.

Embodiment 68 is the RFID tag of embodiment 62, further comprising one or more stand-alone capacitors apart from the IC disposed on a major surface of the substrate and having an equivalent capacitance greater than about 500 pF, the one or more stand-alone capacitors electrically connected in parallel with the antenna and the IC.

Embodiment 69 is the RFID tag of embodiment 68, wherein the one or more stand-alone capacitors have an equivalent capacitance greater than about 1 nF.

Embodiment 70 is the RFID tag of embodiment 68, wherein the one or more stand-alone capacitors have an equivalent capacitance greater than about 2 nF.

Embodiment 71 is the RFID tag of embodiment 68, wherein the antenna, the IC, and the one or more stand-alone capacitors are disposed on a same major surface of the substrate.

Embodiment 72 is the RFID tag of embodiment 68, wherein the one or more stand-alone capacitors comprise a single capacitor.

Embodiment 73 is the RFID tag of embodiment 68, wherein the one or more stand-alone capacitors comprise a plurality of capacitors electrically connected together to provide the equivalent capacitance.

Embodiment 74 is the RFID tag of embodiment 73, wherein the plurality of capacitors are connected in parallel.

Embodiment 75 is the RFID tag of embodiment 73, wherein the plurality of capacitors are connected in series.

Embodiment 76 is the RFID tag of embodiment 62, wherein the conductive trace has a thickness greater than about 1 micrometer along a direction normal to the substrate, and a width greater than about 100 micrometers along a direction parallel to the substrate.

Embodiment 77 is the RFID tag of embodiment 62, wherein conductive trace has a minimum cross sectional area greater than about 100 micrometers squared.

Embodiment 78 is the RFID tag of embodiment 62, wherein the substrate is flexible.

Embodiment 79 is the RFID tag of embodiment 62, wherein a largest lateral dimension of the antenna is less than about 200 mm.

Embodiment 80 is the RFID tag of embodiment 62, wherein a largest lateral dimension of the antenna is less than about 100 mm.

Embodiment 81 is the RFID tag of embodiment 62, wherein a largest lateral dimension of the antenna is less than about 60 mm.

Embodiment 82 is the RFID tag of embodiment 62, wherein a largest lateral dimension of the antenna is less than about 10 mm.

Embodiment 83 is the RFID tag of embodiment 62, wherein the antenna has a single loop.

Embodiment 84 is the RFID tag of embodiment 62, wherein the conductive trace has an average lateral width and a ratio of the largest lateral dimension of the smallest perimeter enclosing the antenna to the average lateral width is in a range of 5 to 60.

Embodiment 85 is the RFID tag of embodiment 84, wherein the ratio of the largest lateral dimension of the smallest perimeter enclosing the antenna to the average lateral width is in a range of 5 to 45.

Embodiment 86 is the RFID tag of embodiment 84, wherein the ratio of the largest lateral dimension of the smallest perimeter enclosing the antenna to the average lateral width is in a range of 7.5 to 30.

Embodiment 87 is the RFID tag of embodiment 62, wherein an outermost loop of the antenna has a top surface having a surface area and a ratio of a smallest area enclosing the outermost loop to the surface area is in a range of 1.2 to 16.

Embodiment 88 is the RFID tag of embodiment 87, wherein the ratio of the smallest area enclosing the outermost loop to the surface area is in a range of 1.5 to 12.

Embodiment 89 is a radio frequency identification (RFID) tag comprising:
 a substrate;
 an antenna having one or more loops disposed on a first major surface of the substrate and extending along a length of the antenna between first and second ends of the antenna; and
 an integrated circuit (IC) disposed on the substrate and electrically coupled to the antenna, such than when the RFID tag is laid flat:
  a largest area enclosed by an innermost loop of the antenna has a first area,
  a smallest area enclosing an outermost loop of the antenna has a second area, and
  a loop in the one or more loops has a top surface having a third area, a ratio of a difference between the second and first areas to the third area being less than about 4.

Embodiment 90 is the RFID tag of embodiment 89 further comprising:
 a first terminal disposed on the first major surface at and in electrical communication with the first end of the antenna; and
 a second terminal disposed on the first major surface at and in electrical communication with the second end of the antenna.

Embodiment 91 is the RFID tag of embodiment 89, wherein the loop in the one or more loops is the innermost loop.

Embodiment 92 is the RFID tag of embodiment 89, wherein the loop in the one or more loops is the outermost loop.

Embodiment 93 is the RFID tag of embodiment 89, wherein the loop in the one or more loops is any loop in the one or more loops.

Embodiment 94 is the RFID tag of embodiment 89, wherein the loop in the one or more loops is an interior loop between the innermost and outermost loops.

Embodiment 95 is the RFID tag of embodiment 89, wherein the antenna has a single loop.

Embodiment 96 is the RFID tag of embodiment 89, wherein the antenna comprises an electrically conductive trace extending along the length of the antenna between the first and second ends of the antenna, the electrically conductive trace having a minimum cross sectional area greater than about 100 micrometers squared.

Embodiment 97 is the RFID tag of embodiment 96, wherein the electrically conductive trace has a thickness greater than about 1 micrometer along a direction normal to the substrate, and a width greater than about 100 micrometers along a direction parallel to the substrate.

Embodiment 98 is the RFID tag of embodiment 89, wherein the ratio of the difference between the second area and the first area to the third area is less than about 3.5.

Embodiment 99 is the RFID tag of embodiment 89, wherein the ratio of the difference between the second area and the first area to the third area is less than about 3.

Embodiment 100 is the RFID tag of embodiment 89, wherein the substrate is flexible.

Embodiment 101 is the RFID tag of embodiment 89, wherein a largest lateral dimension of the antenna is less than about 200 mm.

Embodiment 102 is the RFID tag of embodiment 89, wherein a largest lateral dimension of the antenna is less than about 100 mm.

Embodiment 103 is the RFID tag of embodiment 89, wherein a largest lateral dimension of the antenna is less than about 60 mm.

Embodiment 104 is the RFID tag of embodiment 89, wherein a largest lateral dimension of the antenna is less than about 10 mm.

Embodiment 105 is the RFID tag of embodiment 89, further comprising one or more stand-alone capacitors apart from the IC disposed on a major surface of the substrate and having an equivalent capacitance greater than about 500 pF, the one or more stand-alone capacitors electrically connected in parallel with the antenna and the IC.

Embodiment 106 is the RFID tag of embodiment 105, wherein the one or more stand-alone capacitors comprise a single capacitor.

Embodiment 107 is the RFID tag of embodiment 105, wherein the one or more stand-alone capacitors comprise a plurality of capacitors electrically connected together to provide the equivalent capacitance.

Embodiment 108 is the RFID tag of embodiment 107, wherein the plurality of capacitors are connected in parallel.

Embodiment 109 is the RFID tag of embodiment 107, wherein the plurality of capacitors are connected in series.

Embodiment 110 is the RFID tag of embodiment 89, wherein the antenna comprises a conductive trace having an average lateral width and wherein a ratio of a largest lateral dimension of a smallest perimeter enclosing the antenna to the average lateral width is in a range of 5 to 60.

Embodiment 111 is the RFID tag of embodiment 110, wherein the ratio of the largest lateral dimension of the smallest perimeter enclosing the antenna to the width is in a range of 5 to 45.

Embodiment 112 is the RFID tag of embodiment 110, wherein the ratio of the largest lateral dimension of the smallest perimeter enclosing the antenna to the width is in a range of 7.5 to 30.

Embodiment 113 is the RFID tag of embodiment 89, wherein a ratio of the second area to the third area is in a range of 1.2 to 16.

Embodiment 114 is the RFID tag of embodiment 113, wherein the ratio of the second area to the third area is in a range of 1.5 to 12.

Embodiment 115 is a radio frequency identification (RFID) tag adapted to minimize an effect due to a maximum local parasitic capacitance, comprising:
  a substrate;
  an antenna disposed on a major surface of the substrate and having a length between first and second ends of the antenna;
  an integrated circuit (IC) disposed on a major surface of the substrate and having an effective capacitance; and
  one or more stand-alone capacitors apart from the IC disposed on a major surface of the substrate and connected in parallel with the antenna and the IC, the one or more stand-alone capacitors having an equivalent first capacitance, a parallel sum of the effective capacitance and the first capacitance being at least 4 times the maximum local parasitic capacitance.

Embodiment 116 is the RFID tag of embodiment 115, wherein the parallel sum of the effective capacitance and the first capacitance is at least 10 times the maximum local parasitic capacitance.

Embodiment 117 is the RFID tag of embodiment 115, wherein a source of the maximum local parasitic capacitance comprises a time-varying permittivity.

Embodiment 118 is the RFID tag of embodiment 115, wherein a source of the maximum local parasitic local capacitance comprises a spatially-varying permittivity.

Embodiment 119 is the RFID tag of embodiment 115, wherein a source of the maximum local parasitic local capacitance comprises a permittivity greater than about 4.

Embodiment 120 is the RFID tag of embodiment 115 used in an environment having one of a time- and spatially-varying permittivity, such that a change in the permittivity of about 50% results in a change in a resonant frequency of the RFID tag of less than about 5%.

Embodiment 121 is the RFID tag of embodiment 115 used in an environment having one of a time- and spatially-varying permittivity, such that a change in the permittivity of about 50% results in a change in a resonant frequency of the RFID tag of less than about 2%.

Embodiment 122 is the RFID tag of embodiment 115 used in an environment having one of a time- and spatially-varying permittivity, such that a change in the permittivity of about 50% results in a change in a resonant frequency of the RFID tag of less than about 1%.

Embodiment 123 is the RFID tag of embodiment 115, wherein the first capacitance is greater than about 500 pF.

Embodiment 124 is the RFID tag of embodiment 115, wherein the first capacitance is greater than about 1 nF.

Embodiment 125 is the RFID tag of embodiment 115, wherein the first capacitance is greater than about 2 nF.

Embodiment 126 is the RFID tag of embodiment 115, wherein the antenna, the IC, and the one or more stand-alone capacitors are disposed on a same major surface of the substrate.

Embodiment 127 is the RFID tag of embodiment 115, wherein the antenna comprises one or more loops, each loop having a conductive trace having a thickness greater than about 1 micrometer along a direction normal to the substrate, and a width greater than about 100 micrometers along a direction parallel to the substrate.

Embodiment 128 is the RFID tag of embodiment 115, wherein the antenna comprises an electrically conductive trace extending along the length of the antenna between the first and second ends of the antenna, the electrically conductive trace having a minimum cross sectional area greater than about 100 micrometers squared.

Embodiment 129 is the RFID tag of embodiment 115, wherein the substrate is flexible.

Embodiment 130 is the RFID tag of embodiment 115, wherein a largest lateral dimension of the antenna is less than about 200 mm.

Embodiment 131 is the RFID tag of embodiment 115, wherein a largest lateral dimension of the antenna is less than about 100 mm.

Embodiment 132 is the RFID tag of embodiment 115, wherein a largest lateral dimension of the antenna is less than about 60 mm.

Embodiment 133 is the RFID tag of embodiment 115, wherein a largest lateral dimension of the antenna is less than about 10 mm.

Embodiment 134 is the RFID tag of embodiment 115, wherein the antenna has a single loop.

Embodiment 135 is the RFID tag of embodiment 115, wherein the antenna comprises a conductive trace having an average lateral width and a ratio of a smallest perimeter enclosing the antenna to the average lateral width is in a range of 5 to 60.

Embodiment 136 is the RFID tag of embodiment 135, wherein the ratio is in a range of 5 to 45.

Embodiment 137 is the RFID tag of embodiment 136, wherein the ratio is in a range of 7.5 to 30.

Embodiment 138 is the RFID tag of embodiment 115, wherein the antenna comprises an outermost loop having a top surface having a surface area and a ratio of a smallest area enclosing the outermost loop to the surface area is in a range of 1.2 to 16.

Embodiment 139 is the RFID tag of embodiment 138, wherein the ratio is in a range of 1.5 to 12.

Embodiment 140 is the RFID tag of embodiment 115, wherein the one or more stand-alone capacitors comprise a single capacitor having the first capacitance.

Embodiment 141 is the RFID tag of embodiment 115, wherein the one or more stand-alone capacitors comprise a plurality of capacitors electrically connected together to provide the equivalent first capacitance.

Embodiment 142 is the RFID tag of embodiment 141, wherein the plurality of capacitors are electrically connected in parallel.

Embodiment 143 is the RFID tag of embodiment 141, wherein the plurality of capacitors are electrically connected in series.

Embodiment 144 is a radio frequency identification (RFID) tag having an effective tag capacitance and comprising:
 a substrate;
 an antenna disposed on a major surface of the substrate;
 an integrated circuit (IC) disposed on a major surface of the substrate and having an effective first capacitance; and
 one or more stand-alone capacitors apart from the IC disposed on a major surface of the substrate and electrically connected in parallel with the antenna and the IC, the effective tag capacitance being greater than the effective first capacitance.

Embodiment 145 is the RFID tag of embodiment 144, wherein a ratio of the effective tag capacitance to the effective first capacitance is greater than about 1.5.

Embodiment 146 is the RFID tag of embodiment 144, wherein a ratio of the effective tag capacitance to the effective first capacitance is greater than about 5.

Embodiment 147 is the RFID tag of embodiment 144, wherein the one or more stand-alone capacitors have an equivalent capacitance greater than about 500 pF.

Embodiment 148 is the RFID tag of embodiment 144, wherein the one or more stand-alone capacitors have an equivalent capacitance greater than about 1 nF.

Embodiment 149 is the RFID tag of embodiment 144, wherein the one or more stand-alone capacitors have an equivalent capacitance greater than about 2 nF.

Embodiment 150 is the RFID tag of embodiment 144, wherein the one or more stand-alone capacitors comprise a single capacitor.

Embodiment 151 is the RFID tag of embodiment 144, wherein the one or more stand-alone capacitors comprise a plurality of capacitors electrically connected together to provide the equivalent first capacitance.

Embodiment 152 is the RFID tag of embodiment 151, wherein the plurality of capacitors are electrically connected in parallel.

Embodiment 153 is the RFID tag of embodiment 151, wherein the plurality of capacitors are electrically connected in series.

Embodiment 154 is the RFID tag of embodiment 144, wherein the antenna, the IC, and the one or more stand-alone capacitors are disposed on a same major surface of the substrate.

Embodiment 155 is the RFID tag of embodiment 144, wherein the antenna comprises one or more loops, each loop having a conductive trace having a thickness greater than about 1 micrometer along a direction normal to the substrate, and a width greater than about 100 micrometers along a direction parallel to the substrate.

Embodiment 156 is the RFID tag of embodiment 144, wherein the antenna comprises a conductive trace extending along the length of the antenna, the electrically conductive trace having a minimum cross sectional area greater than about 100 micrometers squared.

Embodiment 157 is the RFID tag of embodiment 144, wherein the substrate is flexible.

Embodiment 158 is the RFID tag of embodiment 144, wherein a largest lateral dimension of the antenna is less than about 200 mm.

Embodiment 159 is the RFID tag of embodiment 144, wherein a largest lateral dimension of the antenna is less than about 100 mm.

Embodiment 160 is the RFID tag of embodiment 144, wherein a largest lateral dimension of the antenna is less than about 60 mm.

Embodiment 161 is the RFID tag of embodiment 144, wherein a largest lateral dimension of the antenna is less than about 10 mm.

Embodiment 162 is the RFID tag of embodiment 144, wherein the antenna has a single loop.

Embodiment 163 is the RFID tag of embodiment 144, wherein the antenna comprises a conductive trace having an average lateral width and a ratio of a largest lateral dimension of a smallest perimeter enclosing the antenna to the average lateral width is in a range of 5 to 60.

Embodiment 164 is the RFID tag of embodiment 163, wherein the ratio is in a range of 5 to 45.

Embodiment 165 is the RFID tag of embodiment 163, wherein the ratio is in a range of 7.5 to 30.

Embodiment 166 is the RFID tag of embodiment 144, wherein an outermost loop of the antenna has a top surface having a surface area and a ratio of a smallest area enclosing the outermost loop to the surface area is in a range of 1.2 to 16.

Embodiment 167 is the RFID tag of embodiment 166, wherein the ratio is in a range of 1.5 to 12.

Embodiment 168 is a radio frequency identification (RFID) tag having a free space resonant wavelength and adapted to minimize an effect due to a maximum local parasitic capacitance, the RFID tag comprising:
 a flexible substrate;
 an antenna formed on a major surface of the substrate and having a conductive trace extending along a length of the antenna between first and second ends of the antenna, the length being less than about 0.1 times the free space resonant wavelength; and
 one or more stand-alone capacitors disposed on a major surface of the substrate and electrically coupled to the antenna and having an equivalent capacitance greater than about 10 pF.

Embodiment 169 is the RFID tag of embodiment 168, wherein an imaginary straight line connecting the first and second ends of the antenna intersects the conductive trace at no more than four other locations.

Embodiment 170 is the RFID tag of embodiment 168, wherein the equivalent capacitance of the one or more stand-alone capacitors is at least 4 times the maximum local parasitic capacitance.

Embodiment 171 is the RFID tag of embodiment 168, wherein the equivalent capacitance of the one or more stand-alone capacitors is greater than about 500 pF.

Embodiment 172 is the RFID tag of embodiment 168, wherein the equivalent capacitance of the one or more stand-alone capacitors is greater than about 1 nF.

Embodiment 173 is the RFID tag of embodiment 168, wherein the equivalent capacitance of the one or more stand-alone capacitors is greater than about 2 nF.

Embodiment 174 is the RFID tag of embodiment 168, wherein the one or more stand-alone capacitor comprise a single capacitor having the equivalent capacitance.

Embodiment 175 is the RFID tag of embodiment 168, wherein the one or more stand-alone capacitors comprise a plurality of individual capacitors electrically connected together to provide the equivalent capacitance.

Embodiment 176 is the RFID tag of embodiment 175, wherein the plurality of capacitors are electrically connected in parallel.

Embodiment 177 is the RFID tag of embodiment 175, wherein the plurality of capacitors are electrically connected in series.

Embodiment 178 is the RFID tag of embodiment 168 further comprising an integrated circuit (IC) disposed on a major surface of the substrate and electrically coupled to the antenna and the stand-alone capacitor.

Embodiment 179 is the RFID tag of embodiment 178, wherein the antenna, the IC, and the stand-alone capacitor are disposed on a same major surface of the substrate.

Embodiment 180 is the RFID tag of embodiment 168, wherein the conductive trace comprises one or more loops, the conductive trace having a thickness greater than about 1 micrometer along a direction normal to the substrate and a width greater than about 100 micrometers along a direction parallel to the substrate.

Embodiment 181 is the RFID tag of embodiment 168, wherein the conductive trace has a minimum cross sectional area greater than about 100 micrometers squared.

Embodiment 182 is the RFID tag of embodiment 168, wherein a largest lateral dimension of the antenna is less than about 200 mm.

Embodiment 183 is the RFID tag of embodiment 168, wherein a largest lateral dimension of the antenna is less than about 100 mm.

Embodiment 184 is the RFID tag of embodiment 168, wherein a largest lateral dimension of the antenna is less than about 60 mm.

Embodiment 185 is the RFID tag of embodiment 168, wherein a largest lateral dimension of the antenna is less than about 10 mm.

Embodiment 186 is the RFID tag of embodiment 168, wherein the antenna has a single loop.

Embodiment 187 is the RFID tag of embodiment 168, wherein the conductive trace has an average lateral width and a ratio of a largest lateral dimension of a smallest perimeter enclosing the antenna to the average lateral width is in a range of 5 to 60.

Embodiment 188 is the RFID tag of embodiment 187, wherein the ratio is in a range of 5 to 45.

Embodiment 189 is the RFID tag of embodiment 187, wherein the ratio is in a range of 7.5 to 30.

Embodiment 190 is the RFID tag of embodiment 168, wherein an outermost loop of the antenna has a top surface having a surface area and a ratio of a smallest area enclosing the outermost loop to the surface area is in a range of 1.2 to 16.

Embodiment 191 is the RFID tag of embodiment 190, wherein the ratio is in a range of 1.5 to 12.

Embodiment 192 is a radio frequency identification (RFID) tag having an effective capacitance greater than about 10 pF and comprising a single loop antenna disposed on a major surface of a flexible substrate.

Embodiment 193 is the RFID tag of embodiment 192, wherein the antenna has a length between first and second ends of the antenna less than about 0.1 times a free space resonant wavelength of the RFID tag.

Embodiment 194 is the RFID tag of embodiment 192 further comprising one or more stand-alone capacitors disposed on a major surface of the substrate and electrically coupled to the antenna, at least some of the one or more stand-alone capacitors comprising one or more ceramic layers disposed between a pair of electrodes.

Embodiment 195 is the RFID tag of embodiment 194, wherein an equivalent capacitance of the one or more stand-alone capacitors is greater than about 500 pF.

Embodiment 196 is the RFID tag of embodiment 194, wherein an equivalent capacitance of the one or more stand-alone capacitors is greater than about 1 nF.

Embodiment 197 is the RFID tag of embodiment 194, wherein an equivalent capacitance of the one or more stand-alone capacitors is greater than about 2 nF.

Embodiment 198 is the RFID tag of embodiment 192 having an effective capacitance greater than about 20 pF.

Embodiment 199 is the RFID tag of embodiment 192 having an effective capacitance greater than about 50 pF.

Embodiment 200 is the RFID tag of embodiment 192 having an effective capacitance greater than about 100 pF.

Embodiment 201 is the RFID tag of embodiment 194 further comprising an integrated circuit (IC) disposed on a major surface of the substrate and electrically coupled to the antenna and the one or more stand-alone capacitors.

Embodiment 202 is the RFID tag of embodiment 201, wherein the antenna, the IC, and the one or more stand-alone capacitors are disposed on a same major surface of the substrate.

Embodiment 203 is the RFID tag of embodiment 192, wherein the antenna comprises a conductive trace having a thickness greater than about 1 micrometer along a direction normal to the substrate and a width greater than about 100 micrometers along a direction parallel to the substrate.

Embodiment 204 is the RFID tag of embodiment 203, wherein the conductive trace has a minimum cross sectional area greater than about 100 micrometers squared.

Embodiment 205 is the RFID tag of embodiment 192, wherein a largest lateral dimension of the antenna is less than about 200 mm.

Embodiment 206 is the RFID tag of embodiment 192, wherein a largest lateral dimension of the antenna is less than about 100 mm.

Embodiment 207 is the RFID tag of embodiment 192, wherein a largest lateral dimension of the antenna is less than about 60 mm.

Embodiment 208 is the RFID tag of embodiment 192, wherein a largest lateral dimension of the antenna is less than about 10 mm.

Embodiment 209 is the RFID tag of embodiment 192, wherein the antenna comprises a conductive trace having an average lateral width, and a ratio of a largest lateral dimension of a smallest perimeter enclosing the antenna to the width is in a range of 5 to 60.

Embodiment 210 is the RFID tag of embodiment 209, wherein the ratio is in a range of 5 to 45.

Embodiment 211 is the RFID tag of embodiment 209, wherein the ratio is in a range of 7.5 to 30.

Embodiment 212 is the RFID tag of embodiment 192, wherein an outermost loop of the antenna comprises a conductive trace having a top surface having a surface area, and a ratio of a smallest area enclosing the outermost loop to the surface area is in a range of 1.2 to 16.

Embodiment 213 is the RFID tag of embodiment 212, wherein the ratio is in a range of 1.5 to 12.

Embodiment 214 is a radio frequency identification (RFID) tag comprising:
  a substrate;
  an antenna having one or more loops disposed on a first major surface of the substrate and extending along a length of the antenna between first and second ends of the antenna, the length being less than about 0.1 times a free space resonant wavelength of the RFID tag; and
  one or more capacitors distinct from any integrated circuit (IC) that may be present on the substrate, the one or more capacitors disposed on a major surface of the substrate and electrically coupled to the antenna, such than when the antenna is laid flat:
    a largest area enclosed by an innermost loop of the antenna has a first area,
    a smallest area enclosing an outermost loop of the antenna has a second area, and
    a loop in the one or more loops has a top surface having a third area, a ratio of a difference between the second and first areas to the third area being less than about 4,
  wherein the antenna comprises a conductive trace having an average lateral width, and a ratio of a largest lateral dimension of a smallest perimeter enclosing the antenna to the average lateral width is in a range of 5 to 60.

Embodiment 215 is the RFID tag of embodiment 214 further comprising an integrated circuit (IC) disposed on a major surface of the substrate, wherein the IC, the antenna and the one or more capacitors are electrically connected to each other in parallel.

Embodiment 216 is the RFID tag of embodiment 214, wherein the ratio of the difference between the second area and the first area to the third area is less than about 3.5.

Embodiment 217 is the RFID tag of embodiment 214, wherein the ratio of the difference between the second area and the first area to the third area is less than about 3.

Embodiment 218 is the RFID tag of embodiment 214, wherein the one or more capacitors have an equivalent capacitance greater than about 500 pF.

Embodiment 219 is the RFID of embodiment 214, wherein the one or more capacitors have an equivalent capacitance greater than about 1 nF.

Embodiment 220 is the RFID of embodiment 214, wherein the one or more capacitors have an equivalent capacitance greater than about 2 nF.

Embodiment 221 is the RFID tag of embodiment 214, wherein the one or more capacitors comprise a single capacitor.

Embodiment 222 is the RFID tag of embodiment 214, wherein the one or more capacitors comprise a plurality of capacitors electrically connected together.

Embodiment 223 is the RFID tag of embodiment 214 having an effective capacitance greater than about 20 pF.

Embodiment 224 is the RFID tag of embodiment 214 having an effective capacitance greater than about 50 pF.

Embodiment 225 is the RFID tag of embodiment 214 having an effective capacitance greater than about 100 pF.

Embodiment 226 is the RFID tag of embodiment 214 further comprising an integrated circuit (IC) disposed on a major surface of the substrate and electrically coupled to the antenna and the capacitor.

Embodiment 227 is the RFID tag of embodiment 226, wherein the antenna, the IC, and the one or more capacitors are disposed on a same major surface of the substrate.

Embodiment 228 is the RFID tag of embodiment 214, wherein the antenna comprises a conductive trace having a thickness greater than about 1 micrometer along a direction normal to the substrate and a width greater than about 100 micrometers along a direction parallel to the substrate.

Embodiment 229 is the RFID tag of embodiment 228, wherein the conductive trace has a minimum cross sectional area greater than about 100 micrometers squared.

Embodiment 230 is the RFID tag of embodiment 214, wherein a largest lateral dimension of the antenna is less than about 200 mm.

Embodiment 231 is the RFID tag of embodiment 214, wherein a largest lateral dimension of the antenna is less than about 100 mm.

Embodiment 232 is the RFID tag of embodiment 214, wherein a largest lateral dimension of the antenna is less than about 60 mm.

Embodiment 233 is the RFID tag of embodiment 214, wherein a largest lateral dimension of the antenna is less than about 10 mm.

Embodiment 234 is the RFID tag of embodiment 214, wherein the ratio of the largest lateral dimension of the smallest perimeter enclosing the antenna to the average lateral width is in a range of 5 to 45.

Embodiment 235 is the RFID tag of embodiment 234, wherein the ratio of the largest lateral dimension of the smallest perimeter enclosing the antenna to the average lateral width is in a range of 7.5 to 30.

Embodiment 236 is the RFID tag of embodiment 214, wherein a ratio of the second area to the third area is in a range of 1.2 to 16.

Embodiment 237 is the RFID tag of embodiment 236, wherein the ratio of the second area to the third area is in a range of 1.5 to 12.

Embodiment 238 is the RFID tag of embodiment 236, wherein the antenna comprises a single loop.

Embodiment 239 is the RFID tag of embodiment 236, wherein the substrate is flexible.

Embodiment 240 is the RFID tag of any of embodiments 2 to 5 or 7 to 239, wherein the substrate is stretchable along a first direction up to about 1.5 times an original unstretched dimension of the substrate without tearing.

Embodiment 241 is the RFID tag of any of embodiments 2 to 23 or 30 to 239, wherein a largest lateral dimension of the antenna along a first direction is less than about 10 cm, and a largest lateral dimension of the antenna along a second direction, perpendicular to the first direction, is less than about 10 cm.

Embodiment 242 is the RFID of any of embodiments 2 to 23 or 30 to 239, wherein a largest lateral dimension of the antenna along a first direction is less than about 10 cm, and a largest lateral dimension of the antenna along a second direction, perpendicular to the first direction, is less than about 5 cm.

Embodiment 243 is the RFID tag of any of embodiments 2 to 23 or 30 to 239, wherein a largest lateral dimension of the antenna along a first direction is less than about 10 cm, and a largest lateral dimension of the antenna along a second direction, perpendicular to the first direction, is less than about 2 cm.

Embodiment 244 is the RFID tag of any of embodiments 2 to 23 or 30 to 239, wherein a largest lateral dimension of the antenna along a first direction is less than about 5 cm, and a largest lateral dimension of the antenna along a second direction, perpendicular to the first direction, is less than about 5 cm.

Embodiment 245 is the RFID tag of any of embodiments 2 to 23 or 30 to 239, wherein a largest lateral dimension of the antenna along a first direction is less than about 8 cm, and a largest lateral dimension of the antenna along a second direction, perpendicular to the first direction, is less than about 2 cm.

Embodiment 246 is the RFID tag of any of embodiments 2 to 23 or 30 to 239, wherein a largest lateral dimension of the antenna along a first direction is less than about 5 cm, and a largest lateral dimension of the antenna along a second direction, perpendicular to the first direction, is less than about 0.5 cm.

Embodiment 247 is the RFID tag of any of embodiments 1 to 239, wherein the antenna has a Q factor greater than about 35.

Embodiment 248 is the RFID tag of embodiment 247, wherein the Q factor is greater than about 40.

Embodiment 249 is the RFID tag of embodiment 247, wherein the Q factor is greater than about 45.

Embodiment 250 is the RFID tag of any of embodiments 1 to 239, wherein the substrate is a polymeric substrate that is sufficiently flexible that it can be wrapped around a cylindrical mandrel having a 3 cm diameter without cracking or crazing.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A radio frequency identification (RFID) tag comprising:
    a substrate;
    an antenna disposed on a major surface of the substrate and having a length less than about 2 meters between first and second ends of the antenna, the antenna comprising an electrically conductive trace extending along the length of the antenna between the first and second ends of the antenna, the electrically conductive trace forming a single loop and having a thickness greater than about 1 micrometer along a direction normal to the substrate, and a width greater than about 100 micrometers along a direction parallel to the substrate;
    an integrated circuit (IC) disposed on a major surface of the substrate and having an effective capacitance less than about 1000 pF; and
    one or more stand-alone capacitors apart from the IC disposed on a major surface of the substrate and having an equivalent capacitance greater than about 500 pF, the one or more stand-alone capacitors electrically connected in parallel with the antenna and the IC.

2. The RFID tag of claim 1, wherein the length of the antenna is less than about 0.5 meters.

3. The RFID tag of claim 1, wherein the effective capacitance of the IC is less than about 100 pF.

4. The RFID tag of claim 1, wherein the electrically conductive trace has a minimum cross sectional area greater than about 500 micrometers squared.

5. The RFID tag of claim 1, wherein a largest lateral dimension of the antenna is less than about 200 mm.

6. The RFID tag of claim 1, wherein the one or more stand-alone capacitors comprises a plurality of capacitors electrically connected together to provide the equivalent capacitance.

7. A radio frequency identification (RFID) tag having a resonant frequency and a corresponding free space resonant wavelength, and adapted to wirelessly communicate with a remote transceiver at or about at the resonant frequency, the RFID tag comprising:
    a substrate;
    an antenna disposed on a major surface of the substrate and having a length between first and second ends of the antenna less than about 0.1 times the free space resonant wavelength, the antenna comprising an electrically conductive trace extending along the length of the antenna between the first and second ends of the antenna, the electrically conductive trace forming a single loop and having a thickness greater than about 1 micrometer along a direction normal to the substrate, and a width greater than about 100 micrometers along a direction parallel to the substrate;
    an integrated circuit (IC) disposed on a major surface of the substrate and having an effective capacitance; and
    one or more stand-alone capacitors having an equivalent first capacitance and disposed on a major surface of the substrate and connected in parallel with the antenna and the IC, a ratio of the first capacitance to the effective capacitance being at least 4.

8. The RFID tag of claim 7, wherein the ratio of the first capacitance to the effective capacitance is at least 10.

9. The RFID tag of claim 7, wherein the electrically conductive trace has a minimum cross sectional area greater than about 500 micrometers squared.

10. The RFID tag of claim 7, wherein a largest lateral dimension of the antenna is less than about 200 mm.

11. The RFID tag of claim 7, wherein the one or more stand-alone capacitors comprise a plurality of capacitors electrically connected together to provide the equivalent first capacitance.

* * * * *